United States Patent
Uken et al.

(10) Patent No.: US 9,440,589 B2
(45) Date of Patent: Sep. 13, 2016

(54) ELECTRO-OPTIC REARVIEW MIRROR ASSEMBLY FOR VEHICLE

(71) Applicant: MAGNA MIRRORS OF AMERICA, INC., Holland, MI (US)

(72) Inventors: John T. Uken, Jenison, MI (US);
Michael J. Baur, Kentwood, MI (US);
Ian A. McCabe, Holland, MI (US);
Hamid Habibi, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/791,948

(22) Filed: Jul. 6, 2015

(65) Prior Publication Data
US 2015/0307028 A1 Oct. 29, 2015

Related U.S. Application Data

(63) Continuation of application No. 14/195,139, filed on Mar. 3, 2014, now Pat. No. 9,073,490, which is a continuation of application No. 13/959,036, filed on Aug. 5, 2013, now Pat. No. 8,665,510, which is a
(Continued)

(51) Int. Cl.
*G02F 1/153* (2006.01)
*B60R 1/08* (2006.01)
(Continued)

(52) U.S. Cl.
CPC ......... *B60R 1/088* (2013.01); *G02F 1/133553* (2013.01); *G02F 1/153* (2013.01); *G02F 1/157* (2013.01); *Y10T 29/49162* (2015.01)

(58) Field of Classification Search
CPC . B60R 1/088; G02F 1/153; G02F 1/133553; G02F 1/157; Y10T 29/49162

USPC ....... 359/245, 265, 267, 844, 850, 871, 883; 345/105

See application file for complete search history.

(56) References Cited

U.S. PATENT DOCUMENTS 4,712,879 A 12/1987 Lynam et al.
4,882,466 A 11/1989 Friel
(Continued)

FOREIGN PATENT DOCUMENTS

WO WO2011/044312 4/2011

OTHER PUBLICATIONS

International Search Report and Written Opinion from PCT Application No. PCT/US2010/029173.

*Primary Examiner* — Tuyen Tra
(74) *Attorney, Agent, or Firm* — Gardner, Linn, Burkhart & Flory, LLP

(57) ABSTRACT

A reflective element assembly for a vehicular rearview mirror assembly includes front and rear substrates with an electro-optic medium disposed therebetween. An electrical connector has an attachment portion and a wire receiving portion for receiving an electrical wire therein. A flange of the attachment portion is configured to be disposed at a fourth surface of the rear substrate and a tab is configured to extend at least partially across a perimeter edge of the rear substrate. An electrically conductive material is disposed in an uncured state and uncured electrically conductive material flows at least partially through the aperture and is cured to secure the electrical connector at the rear substrate. The wire receiving portion of the electrical connector is configured to receive the electrical wire therein and includes at least one tang that engages the electrical wire when the electrical wire is inserted into the wire receiving portion.

20 Claims, 21 Drawing Sheets

Related U.S. Application Data continuation of application No. 13/262,091, filed as application No. PCT/US2010/029173 on Mar. 30, 2010, now Pat. No. 8,503,061.

(60) Provisional application No. 61/288,923, filed on Dec. 22, 2009, provisional application No. 61/232,246, filed on Aug. 7, 2009, provisional application No. 61/186,204, filed on Jun. 11, 2009, provisional application No. 61/164,593, filed on Mar. 30, 2009.

(51) Int. Cl.
*G02F 1/157* (2006.01)
*G02F 1/1335* (2006.01)

(56) References Cited

U.S. PATENT DOCUMENTS

| | | |
|---|---|---|
| 5,066,112 A | 11/1991 | Lynam et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,233,461 A | 8/1993 | Dornan et al. |
| 5,253,109 A | 10/1993 | O'Farrell et al. |
| 5,406,414 A | 4/1995 | O'Farrell et al. |
| 5,521,760 A | 5/1996 | DeYoung et al. |
| 5,525,264 A | 6/1996 | Cronin et al. |
| 5,530,240 A | 6/1996 | Larson et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,725,957 A | 3/1998 | Varaprasad et al. |
| 5,808,777 A | 9/1998 | Lynam et al. |
| 5,818,625 A | 10/1998 | Forgette et al. |
| 5,910,854 A | 6/1999 | Varaprasad et al. |
| 5,985,184 A | 11/1999 | Lynam |
| 6,002,511 A | 12/1999 | Varaprasad et al. |
| 6,102,546 A | 8/2000 | Carter |
| 6,154,306 A | 11/2000 | Varaprasad et al. |
| 6,166,848 A | 12/2000 | Cammenga et al. |
| 6,178,034 B1 | 1/2001 | Allemand et al. |
| 6,249,369 B1 | 6/2001 | Theiste et al. |
| 6,297,900 B1 | 10/2001 | Tulloch et al. |
| 6,329,925 B1 | 12/2001 | Skiver et al. |
| 6,356,376 B1 | 3/2002 | Tonar et al. |
| 6,606,184 B2 | 8/2003 | Guarr et al. |
| 6,665,107 B2 | 12/2003 | Forgette et al. |
| 6,690,268 B2 | 2/2004 | Schofield et al. |
| 7,004,592 B2 | 2/2006 | Varaprasad et al. |
| 7,064,882 B2 | 6/2006 | Tonar et al. |
| 7,184,190 B2 | 2/2007 | McCabe et al. |
| 7,195,381 B2 | 3/2007 | Lynam et al. |
| 7,202,987 B2 | 4/2007 | Varaprasad et al. |
| 7,255,451 B2 | 8/2007 | McCabe et al. |
| 7,256,923 B2 | 8/2007 | Liu et al. |
| 7,274,501 B2 | 9/2007 | McCabe et al. |
| 7,310,177 B2 | 12/2007 | McCabe et al. |
| 7,310,178 B2 | 12/2007 | Lawlor et al. |
| 7,324,261 B2 | 1/2008 | Tonar et al. |
| 7,338,177 B2 | 3/2008 | Lynam |
| 7,349,144 B2 | 3/2008 | Varaprasad et al. |
| 7,355,161 B2 | 4/2008 | Romig et al. |
| 7,360,932 B2 | 4/2008 | Uken et al. |
| 7,372,611 B2 | 5/2008 | Tonar et al. |
| 7,400,435 B2 | 7/2008 | Byers et al. |
| 7,446,924 B2 | 11/2008 | Schofield et al. |
| 7,467,883 B2 | 12/2008 | DeLine et al. |
| 7,602,542 B2 | 10/2009 | Tonar et al. |
| 7,626,749 B2 | 12/2009 | Baur et al. |
| 7,663,798 B2 | 2/2010 | Tonar et al. |
| 7,830,583 B2 | 11/2010 | Neuman et al. |
| 7,855,755 B2 | 12/2010 | Weller et al. |
| 7,864,398 B2 | 1/2011 | Dozeman et al. |
| 7,864,399 B2 * | 1/2011 | McCabe ............... G02F 1/157 359/265 |
| 8,004,741 B2 | 8/2011 | Tonar |
| 8,035,881 B2 | 10/2011 | Luten et al. |
| 8,335,032 B2 | 12/2012 | McCabe et al. |
| 8,503,061 B2 | 8/2013 | Uken et al. |
| 8,665,510 B2 | 3/2014 | Uken et al. |
| 8,917,437 B2 | 12/2014 | Baur et al. |
| 9,073,490 B2 | 7/2015 | Uken et al. |
| 2006/0061008 A1 | 3/2006 | Karner et al. |
| 2011/0188122 A1 | 8/2011 | Habibi et al. |
| 2012/0038964 A1 | 2/2012 | De Wind et al. |

\* cited by examiner

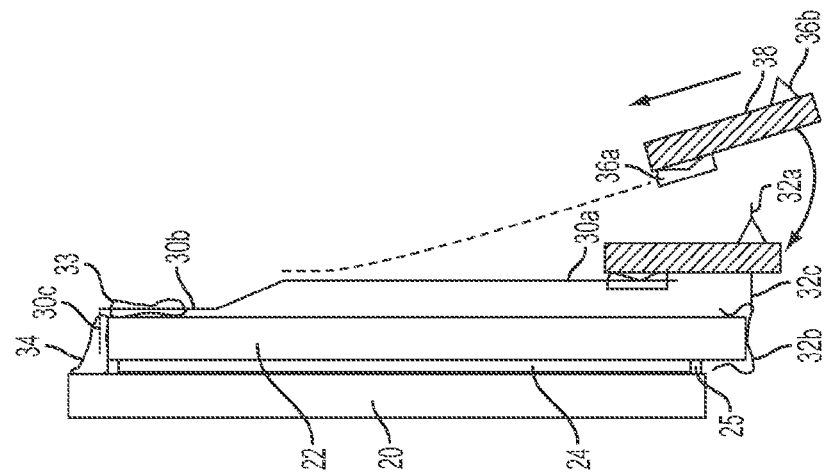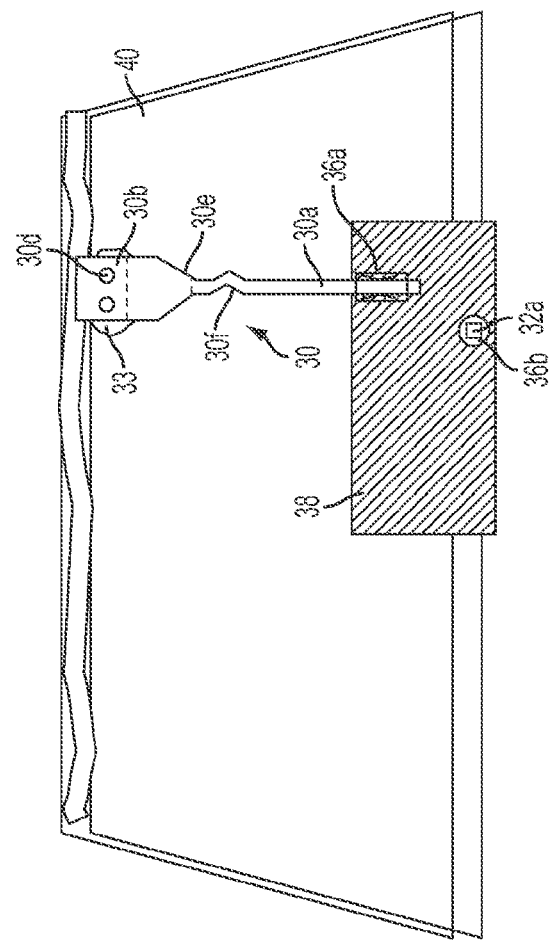

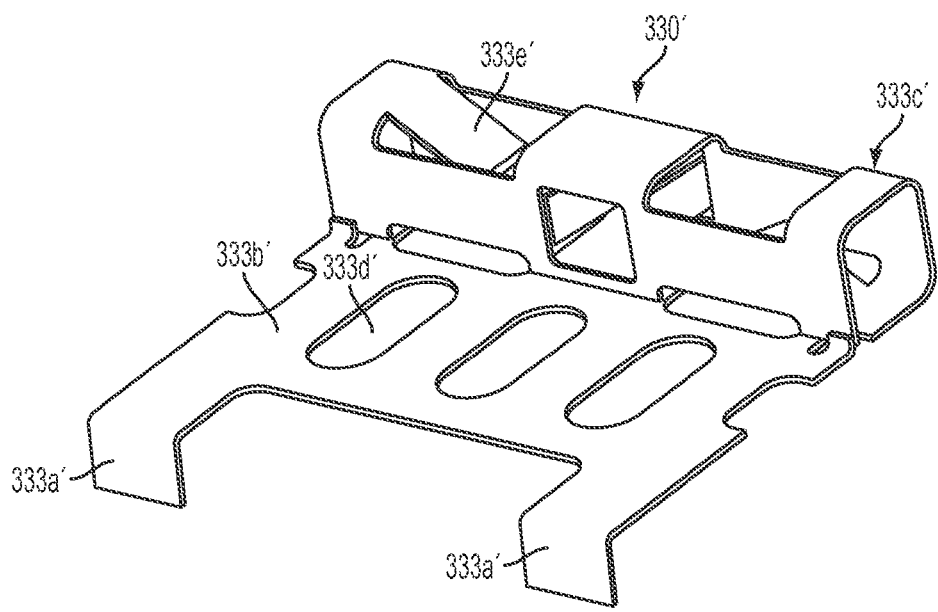
FIG. 28
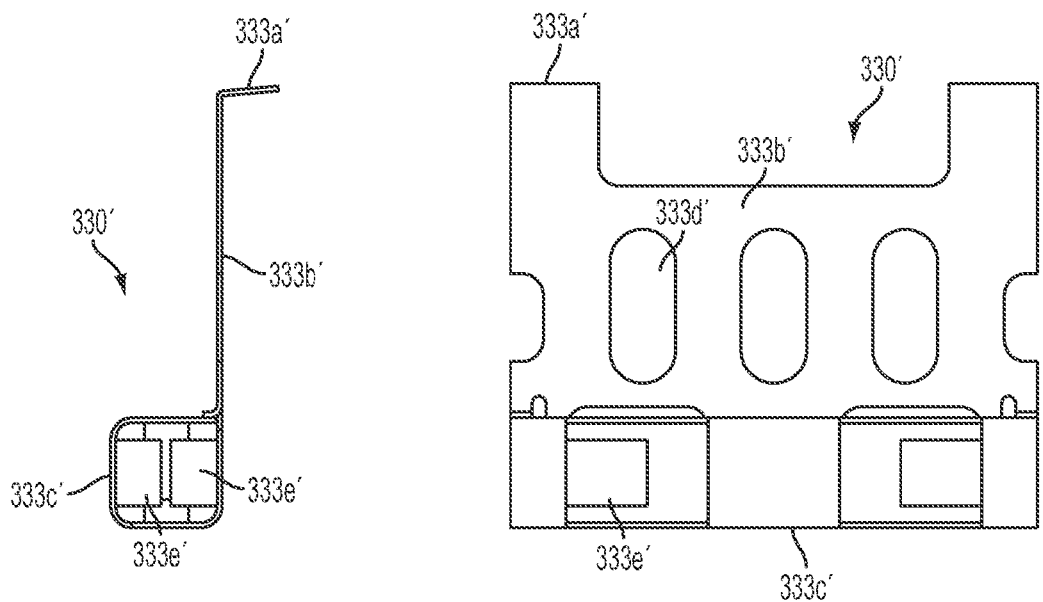
FIG. 29
FIG. 30

ELECTRO-OPTIC REARVIEW MIRROR ASSEMBLY FOR VEHICLE

CROSS REFERENCE TO RELATED APPLICATIONS

The present application is a continuation of U.S. patent application Ser. No. 14/195,139, filed Mar. 3, 2014, now U.S. Pat. No. 9,073,490, which is a continuation of U.S. patent application Ser. No. 13/959,036, filed Aug. 5, 2013, now U.S. Pat. No. 8,665,510, which is a continuation of U.S. patent application Ser. No. 13/262,091, filed Sep. 29, 2011, now U.S. Pat. No. 8,503,061, which is a 371 U.S. national phase filing of PCT Application No. PCT/US2010/029173, filed Mar. 30, 2010, which claims the benefit of U.S. provisional applications, Ser. No. 61/288,923, filed Dec. 22, 2009; Ser. No. 61/232,246, filed Aug. 7, 2009; Ser. No. 61/186,204, filed Jun. 11, 2009; and Ser. No. 61/164,593, filed Mar. 30, 2009, which are hereby incorporated herein by reference in their entireties.

FIELD OF THE INVENTION

The present invention relates to interior rearview mirror assemblies and, more particularly, to electro-optic or electrochromic reflective element assemblies and a method for manufacturing electro-optic or electrochromic reflective element assemblies.

BACKGROUND OF THE INVENTION

Automotive electrochromic mirror reflective element cell assemblies are known and typically include a front substrate and a rear substrate and an electrochromic medium sandwiched therebetween and contained within an interpane cavity. The front substrate typically includes a transparent conductive coating established at its rearward surface (the surface facing the rear substrate and the electrochromic medium) and the rear substrate typically includes a conductive coating (such as a metallic reflector coating or coatings and/or a transparent conductive coating or coatings) established at its front surface (the surface facing the front substrate and the electrochromic medium). Electrical connectors are provided, typically as metallic busbar clips that extend substantially along respective edges of the substrates, to provide electrical current to the conductive coatings to control the dimming or darkening of the electrochromic medium.

SUMMARY OF THE INVENTION

The present invention provides an electro-optic mirror reflective element assembly, such as an electrochromic mirror reflective element assembly that has electrical connectors for powering the cell or reflective element assembly that provide enhanced electrical connection and enhanced manufacturing processes, while reducing the costs associated with the assembly and construction of the mirror reflective element assembly. Optionally, the mirror reflective element assembly may comprise a third surface metallic reflector and may include a transmission-reducing thin film coating (such as a chrome/chromium coating and/or other suitable metallic coating or layer or the like) at the rear or fourth surface of the reflective element assembly.

These and other objects, advantages, purposes and features of the present invention will become apparent upon review of the following specification in conjunction with the drawings.

BRIEF DESCRIPTION OF THE DRAWINGS

FIG. 4 is a perspective view of the reflective element assembly of FIG. 2, shown with a printed circuit board connected to the connectors;

FIG. 5 is a side elevation and partial sectional view of the reflective element assembly of FIG. 4, showing the connection process of connecting the circuit board to the connectors;

FIG. 28 is a perspective view of another electrical connector for electrically connecting to a conductive coating of the reflective element assembly of the present invention;

FIG. 29 is an end elevation of the electrical connector of FIG. 28;

FIG. 30 is a plan view of the electrical connector of FIGS. 28 and 29;

FIG. 38 is a perspective view of another electrical connector for electrically connecting to a conductive coating of a reflective element assembly in accordance with the present invention, such as via establishing electrical conductive continuity to an electrically conductive coating on a front substrate of the reflective element assembly via a conductive epoxy or the like;

DESCRIPTION OF THE PREFERRED EMBODIMENTS

Figure 1:
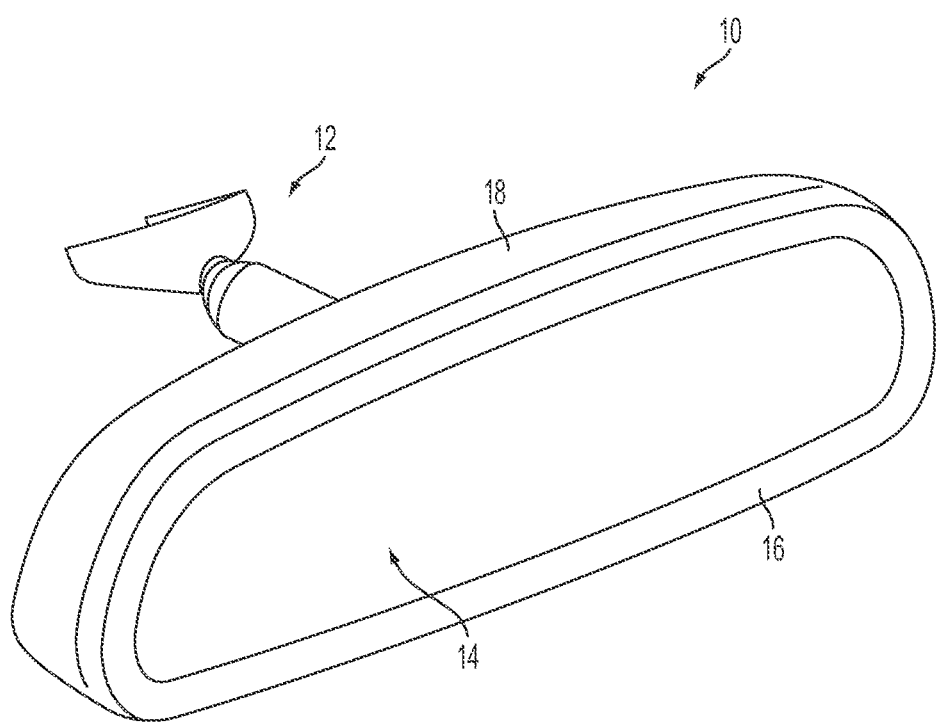
FIG. 1 is a perspective view of an interior rearview mirror assembly incorporating a reflective element assembly of the present invention.

Referring now to the drawings and the illustrative embodiments depicted therein, an interior rearview mirror assembly 10 is pivotally or adjustably mounted to an interior portion of a vehicle via an adjustable mounting assembly 12, such as via a double ball mounting or bracket assembly (FIG. 1). Mirror assembly 10 includes an electro-optic reflective element 14 (such as an electrochromic reflective element assembly), a bezel portion 16 and a housing or casing 18. The reflective element assembly 14 is electrically connected to a circuit element or circuitry (such as a printed circuit board or the like) that is electrically powered to control the dimming or darkening of the reflective element assembly 14, as discussed below.

Figure 3:
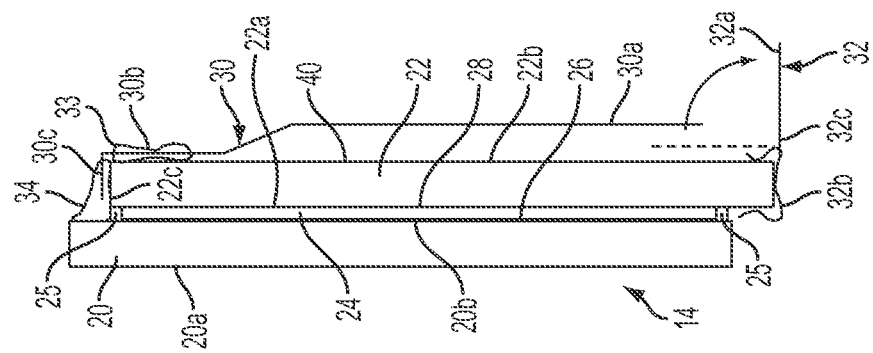
FIG. 3 is a side elevation and partial sectional view of the reflective element assembly of FIG. 2.
Figure 2:
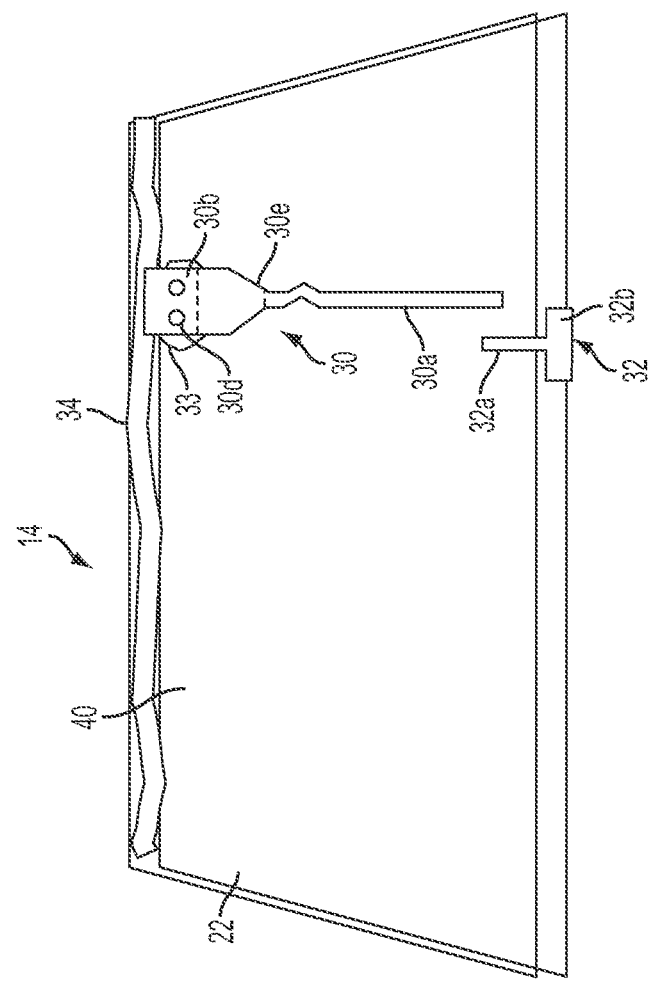
FIG. 2 is a perspective view of a reflective element assembly of the present invention.

As shown in FIGS. 2 and 3, the reflective element 14 includes a front substrate 20 and a rear substrate 22, with an electro-optic medium 24 (such as an electrochromic medium) disposed therebetween (and sealed or contained within the interpane cavity between the glass substrates 20, 22 via a perimeter seal 25). The front substrate 20 has a front or first surface 20a (that faces generally towards a driver of a vehicle when the mirror assembly is normally mounted in the vehicle) and a rear or second surface 20b, with a transparent conductive coating 26 (such as an indium tin oxide (ITO) coating or the like) established on second surface 20b, while the rear substrate 22 has a front or third surface 22a (facing the electro-optic medium disposed between the front and rear substrates) and a rear or fourth surface 22b, with a metallic reflector coating 28 (such as a transflective display-on-demand reflector coating that is partially transmissive of light therethrough and partially reflective of light incident thereon) established on third surface 22a. An electrical connector 30 is conductively connected to the transparent conductive coating 26 at second surface 20b of front substrate 20, and another electrical connector 32 is conductively connected to the metallic reflector coating 28 at third surface 22a of rear substrate 22, whereby electrical power is supplied to the coatings 26, 28 via connectors 30, 32 to vary the degree of dimming or darkening of the electro-optic medium 24.

Electrical connector 30 comprises a metallic element, such as a stamped metallic element or the like, having an elongated tab portion 30a extending from an attachment portion 30b and at least partially across the fourth surface 22b of rear substrate 22, and a connecting portion 30c extending from attachment portion and at least partially across an edge or edge dimension 22c of rear substrate 22. As can be seen in FIGS. 2 and 3, attachment portion 30b is attached to the fourth surface 22b of rear substrate 22, such as via an adhesive 33. Optionally, attachment portion 30b may include one or more apertures 30d to enhance the adhesion of the attachment portion 30b to the fourth surface 22b of rear substrate 22. Connecting portion 30c of electrical connector 30 is bent, such as about 90 degrees or thereabouts, relative to attachment portion 30b so as to extend at least partially across the edge dimension 22c of rear substrate 22.

As shown in FIG. 3, a conductive material 34 (such as a conductive epoxy or conductive paste or conductive potting material or the like) may be disposed at edge dimension 22c and at a corresponding overhang region of front substrate 20 so as to electrically conductively connect connecting portion 30c to the transparent conductive coating 26 at rear or second surface 20b of front substrate 20. The perimeter seal 25 may electrically isolate the conductive material 34 from the third surface reflector coating 28. For example, the third surface reflector coating 28 may be established at third surface 22a of rear substrate 22 and may not extend to the edge dimension 22c at least in the region of connecting portion 20c so as to electrically isolate reflector coating 28 from electrical connector 30. The conductive connection between the second surface transparent conductive coating 26 and the electrical connector 30 may utilize aspects of the reflective element assemblies described in U.S. Pat. Nos. 7,184,190 and/or 7,255,451, and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, and/or U.S. provisional application Ser. No. 61/301,417, filed Feb. 4, 2010, which are hereby incorporated herein by reference in their entireties.

In the illustrated embodiment, and as can be seen in FIGS. 2 and 3, tab portion 30a of electrical connector 30 extends substantially across the rear surface 22b of rear substrate 22. Tab portion 30a may comprise a flexible or bendable tab that may flex at bend regions 30e to allow for bending of tab portion 30a away from the rear surface 22b of rear substrate 22 for connecting to a circuit element or printed circuit board, as discussed below.

Electrical connector 32 electrically conductively connects to the third surface conductive reflector coating 28. Electrical connector 32 includes a tab portion 32a and a connecting portion 32b that electrically and conductively connects to third surface reflector coating 28 at third surface 22a of rear substrate 22. In the illustrated embodiment, connecting portion 32b comprises a metallic clip (such as a flexible clip that clamps around the edge of the substrate) that receives and clips onto an edge region of the rear substrate at an overhang region of the rear substrate so as to establish electrical conductivity to the reflector coating 28. Optionally, and desirably, the third surface 22a may have a tab out conductive coating established thereon and at the region where the connecting portion 32b attaches or clips, with the tab out coating establishing electrical conductivity between a perimeter region of the third surface 22a and the reflector coating 28 established at the principal reflecting region of the reflective element inboard of the perimeter seal 25 (such as by utilizing aspects of the reflective element assemblies described in U.S. Pat. Nos. 7,184,190 and/or 7,255,451, and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, which are hereby incorporated herein by reference in their entireties). Optionally, the connector 32 may be encapsulated to protect the mirror reflector coating or tab out coating or layer.

Thus, when assembled, the reflective element includes electrical connectors 30, 32, with the respective connector tabs 30a, 32a extending along the rear surface of the rear substrate 22. In the illustrated embodiment, the second surface electrical connector 30 extends substantially across the rear substrate, while the third surface reflector electrical connector 32 comprises a relatively short connector. However, the connectors may have different sizes and lengths without affecting the scope of the present invention.

The electrical connection to the second surface transparent conductive coating 26 may be made via electrical connector 30 and the conductive material or epoxy 34. For example, the connecting portion 30c may be inserted into uncured conductive epoxy established at the overhang region, whereby when the conductive epoxy cures, the connecting portion 30c of electrical connector 30 is secured therein and is electrically conductively connected to the second surface transparent conductive coating 26 at the second surface 20b of front substrate 20. At the time that the connecting portion 30c is inserted into the uncured conductive epoxy, the attaching portion 30b may be adhered to the fourth surface 22b of the reflective element assembly.

When assembled, the tab portions 30a, 32a of the electrical connectors may be bent or formed to extend generally across or partially across the rear surface of the rear substrate. As shown in FIGS. 4 and 5, the tab portions 30a, 32a may be flexed or bent (such as at bend regions 30e, 32c to align the clips with connectors or receptacles 36a, 36b at a circuit element 38, such as a printed circuit board or the like with circuitry established on a substrate or chip. For example, and as shown in FIG. 5, tab portion 30a may be bent or flexed outward away from the rear surface 22b of rear substrate 22, and may be inserted into receptacle 36a at circuit element 38. When the tab portion 30a is received in receptacle 36a, the tab portion 32a of electrical connector 32 may be aligned with a second receptacle or connector 36b at circuit element 38. Optionally, for example, tab receptacle 36a may allow the end of the tab portion 30a to pass through to allow for additional positional tolerance and adjustability so as to assist an operator in aligning tab portion 32a with receptacle 36b. Optionally, the tab portion 30a may have a bend pattern 30f stamped or formed therealong to provide enhanced flexibility to allow for side-to-side positional tolerance and adjustability so as to assist an operator in aligning tab portion 32a with receptacle 36b.

Figure 6:
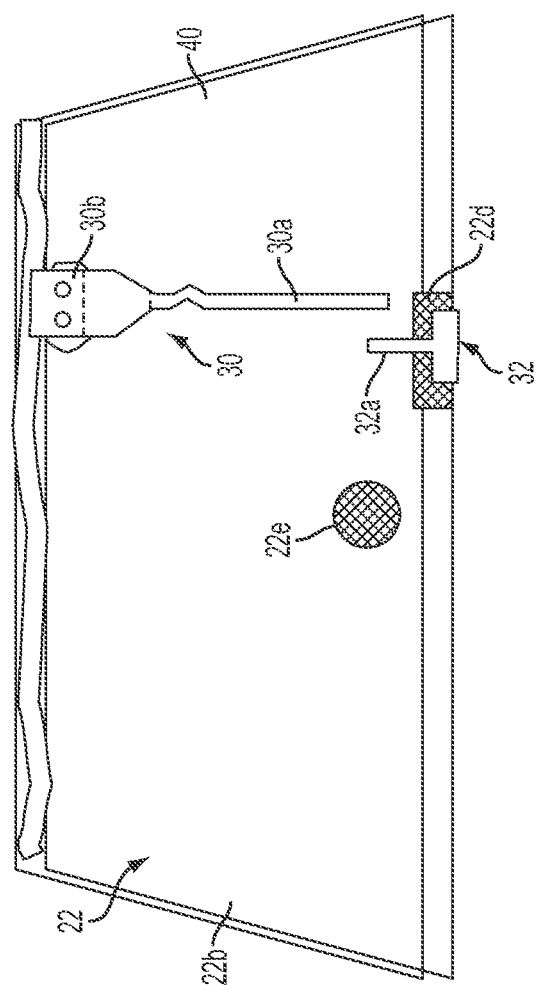
FIG. 6 is a perspective view of the reflective element assembly of FIG. 2, showing portions of the rear surface that may be masked prior to coating the rear surface of the reflective element assembly with a coating.

When the circuit element 38 is attached or connected to tab portion 30a, the receptacle or connector 36b of circuit element 38 may be generally aligned with tab portion 32a of electrical connector 32. As can be seen in FIG. 6, tab portion 32a may be bent or flexed so that it extends rearward and away from rear surface 22b of rear substrate 22, whereby the tab portion 32a may be received in and through receptacle 36b as the circuit element 38 (and tab portion 30a) is moved toward the rear surface of the reflective element. Thus, after the tab portion 30a is engaged with the receptacle 36a at circuit element 38, circuit element 38 can rotate towards the rear substrate 22 whereby the bent up or outwardly protruding tab portion 32a may plug into the receptacle 36b at circuit element 38 to complete the electrical connection of the circuit element to the electrical connectors 30, 32. Thus, the electrical connection and cell construction of the present invention provides a reduced cost construction and enhanced manufacturing and assembly processing for an electro-optic mirror reflective element assembly and its electrical connectors that connect to the conductive coatings or layers established at the second and third surfaces of the reflective element assembly.

Although shown and described as having a clip portion that clips around the perimeter edge of the rear substrate, it is envisioned that the electrical connector that connects to the third surface conductive coating or coatings may be attached to the rear or fourth surface of the rear substrate and reflective element, such as via a suitable adhesive or the like. For example, the tab out portion at the third surface may comprise a wraparound portion that wraps around the perimeter edge of the rear substrate to provide electrical continuity between the fourth surface and the third surface (such as by utilizing aspects of the mirror assemblies described in U.S. Pat. Nos. 7,400,435; 7,184,190 and/or 7,255,451, and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, and/or PCT Application No. PCT/US2007/082099, filed Oct. 22, 2007 and published May 2, 2008 as International Publication No. WO 2008/051910, which are hereby incorporated herein by reference in their entireties). The electrical connector may otherwise be similarly constructed as described above, and may flex or bend to align with a receptacle at the circuit element to electrically connect to the circuit element or board, such as in a similar manner as described above.

Optionally, the reflective element assembly 14 may include an opaque reflecting coating or layer or transmission-reducing thin film coating or layer 40, such as a chrome/chromium coating or layer or the like, established at the fourth or rear surface 22b of the rear substrate 22. The fourth surface opaque reflecting or transmission-reducing thin film coating or layer (or other suitable any light transmission-reducing film or layer or coating, such as a silicon layer or the like) may replace the opaque or black light mask tape and application equipment that is typically used to cover the rear surface of the reflective element to limit light passage from behind the reflective element and through the rear substrate of the reflective element. The opaque reflecting or transmission-reducing thin film coating or layer functions to limit light transmission through the rear substrate and also provides enhanced reflectivity of the mirror reflective element by providing a reflective coating behind the third surface partially reflective partially transmissive reflector coating at the third surface of the rear substrate. Although discussed as comprising a chrome/chromium coating or layer, the opaque or light transmission-reducing thin film or coating or layer may comprise any suitable material, such as chrome/chromium or silicon or chromium oxide or titanium or the like, and may or may not be reflective of light incident thereon, while remaining within the spirit and scope of the present invention.

The rear substrate may be masked during the opaque reflecting or transmission-reducing layer coating process (typically a vacuum-deposition process and preferably a vacuum-deposition sputtering process as is known in the thin film coating arts) so as to limit or substantially preclude depositing or establishing the opaque reflecting or transmission-reducing thin film layer in areas where it is not desired. For example, in order to electrically isolate the electrical connectors 30, 32, and as shown in FIG. 6, the rear substrate 22 may be masked at the region 22d where the electrical connector 32 connects or clips to the rear substrate so as to be devoid of the opaque reflecting or transmission-reducing thin film coating in that area to avoid shorting that may otherwise occur if electrical connector 32 and electrical connector 30 were both in contact with the opaque reflecting or transmission-reducing thin film coating (such as chrome/chromium or the like). Optionally, and as shown in FIG. 6, one or more other regions or areas 22e of the rear surface 22b of the rear substrate 22 may be masked, such as by using a fixed or movable mask in-chamber during a vacuum-deposition sputtering process, such as for a rearward facing photosensor location or the like (such as for a location at which a glare light sensor may be disposed to detect glare light rearward of the vehicle, such as for detecting headlamps of following vehicles, whereby the dimming or darkening of the electro-optic reflective element assembly may be responsive to such glare detection).

The masking of the substrate surface may be achieved via any suitable means, such as, for example, use of a clean removing tape, screen printing that washes off during the washing of the substrate following the opaque reflecting or transmission-reducing or chrome/chromium coating process, use of a clear ink that resists the chrome/chromium coating (and the clear ink may then remain on the substrate after the washing process), and/or the like. Although shown and described as masked areas for the electrical connector and a glare photosensor, clearly other areas or regions may be masked during the fourth surface chrome/chromium (or other metal) vacuum-deposition coating process, such as for a display-on-demand display device (such as a video display or the like) or for a rearward facing camera (such as for a cabin monitoring system or the like) or for any other accessory that would be suitable for use at a partially transmissive reflective element assembly.

The reflective element thus may a fourth surface thin film coating, preferably a sputtered metal thin film coating, such as a chrome/chromium coating (or other suitable opacifying coating or layer or material), that has low light transmission (preferably less than 1 percent visible light transmission, more preferably less than about 0.5 percent visible light transmission) with one or more light transmitting windows established through the fourth surface metal thin film coating. Thus, the transflective mirror reflector disposed on the third surface of the mirror reflective element provides a display on demand or transflective mirror reflective element at the light transmitting windows (with the reflective element at the window regions being at least partially transmissive of light therethrough, while being substantially limiting to transmission of light through the mirror reflective element where the fourth surface opaque layer or coating is disposed at the fourth surface). However, the outline of the sensor hole or aperture or window in the fourth surface metal thin film coating may be visible or discernible when the mirror assembly is normally mounted in a vehicle equipped with the mirror assembly and the reflective element assembly is normally viewed by the driver of the equipped vehicle. Such a discernibility of the window (and/or of the presence of a sensor or display or the like disposed thereat and therebehind) may be due to the visible contrast ratio (as visibly discernible in reflection by a driver normally viewing the mirror as mounted in the equipped vehicle) between the metal thin film coated area and the taped or masked portion or window area. For example, if the fourth surface metal thin film coating on the fourth surface of the reflective element has a reflectance of about 40 percent of light incident thereon and the rear surface of the glass substrate at its uncoated window area has a reflectance of about the 4 percent of light incident thereon, then the visibly discernible contrast ratio is about ten to one. Optionally, the masking and windows may be accomplished in a manner to reduce the contrast ratio or otherwise reduce the discernibility of the window established through the fourth surface metal thin film coating.

For example, the visibly discernible contrast (between the window area of the substrate and the fourth surface metal thin film coated area of the substrate surrounding an adjacent window formed therethrough) may not be as noticeable or discernible (when incorporated into an interior rearview mirror assembly construction such as described above and when normally viewed by a driver of an equipped vehicle) if the edges of the metal thin film coating surrounding/adjacent the window established in the fourth surface metal thin film coating are rendered non-sharp (such as by tapering the physical thickness of the metal thin film coating, with the tapering comprising, for example, a gradation or reduction in thickness from the physical thickness of the coating at the fourth surface to about a zero thickness dimension at the window area, which may be devoid of the fourth surface metal thin film material or layer) rather than a steep or sudden change caused by the likes of use of a sharply defined masking tape or mask edge to establish the window in the fourth surface metal thin film coating at the fourth surface during its vacuum-deposition, typically during a vacuum-deposition sputter coating process. Optionally, the reflectance of the fourth surface metal thin film surrounding and immediately adjacent the uncoated glass surface constituting the window, as seen through the reflective element, can be rendered non-uniform by using a raised mask (used during vacuum-deposition of the fourth surface metal thin film at the fourth or rear surface of the rear substrate) that is raised above or spaced from the rear surface of the rear substrate, whereby a shadow generated by the mask establishes a tapered coating thickness and varying or non-uniform reflectance at the transition area between the outer edges of the masked area or window area toward the center of the sensor window. Optionally, the reflectance can be rendered non-uniform by using an index matching adhesive and a backing film (such as a metalized Mylar backing film or the like) to reduce the contrast. The photosensor can be embedded in such a metalized film with an adhesive (such as a pressure sensitive adhesive or the like) that attaches to the substrate at the sensor window that is established through the metal thin film coating. Optionally, the fourth surface metal thin film coating, such as a chrome/chromium coating, may have a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, to taper the coating thickness at the transition region or to vary or render non-uniform the reflectance or contrast at the transition region, some of the metal thin film coating may be removed at the edges of the window to taper the coating thickness by removing more metal thin film closer to the sensor window and less away from the sensor window. The sensor hole or aperture or window thus may be less noticeable or less visibly discernible to a driver of the equipped vehicle when normally viewing the reflective element as normally mounted in the equipped vehicle, because the percent transmissivity and percent reflectance of the metal thin film layer gradually changes at the edge regions of the window so that there is not a sharp change in contrast at the perimeter edges of the window. The aspects of the present invention, as exemplified above, where the likes of a photosensor is disposed behind and at the subject hole or aperture of the coating of the rear substrate, may be further applicable to the likes of a third surface coating and/or disposition of the likes of a display or other element to the rear of the fourth surface of the reflective element and at and viewing through or emitting light through such an aperture or hole or window established through the third surface coating and/or the fourth surface coating.

Figure 25:
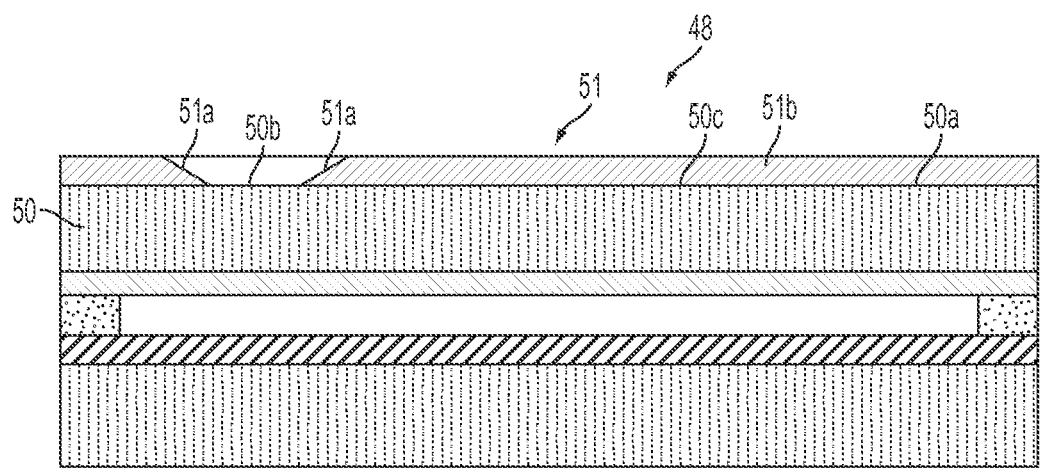
FIG. 25 is a sectional view of a reflective element assembly in accordance with the present invention.

For example, and with reference to FIG. 25, a reflective element assembly 48 has a rear substrate 50 with an at least substantially opaque metal thin film 51 disposed at a rear surface 50a of rear substrate 50. The fourth surface metal thin film or coating 51 has a window or aperture established therethrough at a window region 50b of the rear substrate 50, where the rear surface 50a of rear substrate 50 is substantially devoid of the metal thin film 51 at the window region 50b. A transition portion 51a of the metal thin film 51 surrounds and is adjacent to the window region 50b and provides a non-sharp transition between the substantially uncoated window region 50b and a fully coated/higher and uniformly reflective rear surface region 50c, where the rear surface 50a of rear substrate 50 is coated by a generally uniform thickness mirror coating portion 51b of metal thin film 51 (which may have a physical thickness over substantially the entire rear surface that is at least about 300 angstroms, and more preferably at least about 500 angstroms and more preferably at least about 700 angstroms, except at and around the window area and transition portion). In the illustrated embodiment, transition portion 51a of metal thin film 51 has a varying or tapered thickness so as to provide a non-uniform reflectance at the transition portion or region circumscribing or surrounding the window region and a non-sharp change in reflectance between the light transmitting window region 50b of the rear substrate 50 and the highly reflecting coated region 50c of the rear substrate (the area at which the generally uniform thickness metal thin film coating portion 51b is disposed). Optionally, although shown as having a tapered thickness of the metal thin film layer surrounding the hole or window, it is envisioned that other means for rendering the reflectance at the transition region non-uniform may be implemented, such as, for example, a gradient or fuzzy or irregular or non-uniform metal thin film deposition at the border area immediately adjacent and around the hole or window, while remaining within the spirit and scope of the present invention.

Thus, the present invention provides a vehicular reflective element assembly that has a window established through a transmission-reducing thin film coating at the fourth or rearmost surface of the reflective element, with the window region being substantially devoid of the thin film coating at a location where a sensor is disposed behind the reflective element and having a field of view through the reflective element and through the window. A portion of the transmission-reducing thin film coating at and around and circumscribing the window locally varies in physical thickness, with a minimum physical thickness of the thin film coating being closest to the window and with the physical thickness of the thin film coating generally increasing to a generally maximum physical thickness of the thin film coating at a distance from the window (and with the generally maximum physical thickness of the thin film coating corresponding with the physical thickness of the thin film coating that is disposed at substantially the rest of the rear surface remote from the window region). For example, the transition portion or tapering portion of the thin film coating between the minimum physical thickness portion and the generally maximum physical thickness portion may extend a distance of between about 1 mm and 20 mm or thereabouts from the window, or between about 2 mm and 15 mm or thereabouts from the window, or between about 3 mm and 10 mm or thereabouts from the window, and thus providing a gradual change in the physical thickness of the fourth surface thin film coating so that the window is not readily discernible by a person viewing the mirror reflective element when the mirror assembly is normally mounted in a vehicle. Although it is referenced above as having a generally uniform thickness, clearly the transmission-reducing thin film coating that is disposed at the rear surface of the reflective element away from the transition region and the window may have variations in its physical thickness, while remaining within the spirit and scope of the present invention.

By affirmatively rendering non-sharp the transition between the lower reflectance in the window/non-coated area (typically around 4 percent or thereabouts) and the higher reflectance of the immediately adjacent and surrounding area coated by the fourth surface metal thin film coating (typically having a reflectance of at least about 40 percent, often at least about 50 percent), the discernibility of the window established through the fourth surface metal thin film to a driver viewing the completed mirror assembly (where the second or rear substrate forms an element of the reflective element of the mirror assembly) is reduced. It has been found that this can be achieved by affirmatively rendering non-sharp the transition region surrounding the window, and this may be achieved in a variety of transition coating or deposition means. For example, it has been found that if the region surrounding and immediately adjacent to the window (typically the region within about 2 mm of the window and up to about 5 mm or more from the window) is rendered non-uniform in reflectance compared to the rest of the fourth surface reflective metal thin film coating, so that the transition from the highly reflecting fourth surface metal thin film coating to the lower reflecting (such as about 4 percent reflecting) bare glass at the window is non-uniformly reflecting and non-sharp, the discernibility of the window may be substantially reduced.

To achieve this, for example, the non-sharp, such as tapered, coating thickness or varying or non-uniform reflectance of the fourth surface opaque coating may be established at the transition region by a masking element that is at least partially spaced from the window region to allow for partial coating of at least a perimeter region of the window region. For example, and with reference to FIGS. 17-20, a mirror substrate 50 may be coated (on a surface of the substrate that will be the fourth surface or rear surface of the reflective element assembly or mirror cell) with a substantially opaque coating or metal thin film layer, such as a chrome/chromium coating or layer (or other suitable opacifying layer or coating or material) and, during the vacuum-deposition coating of the metal thin film at the rear surface of the mirror substrate, a raised masking element 52 may be disposed at the surface 50a of the substrate 50 at the location of a window for a sensor or the like. Raised masking element 52 includes a base portion or smaller diameter or smaller profile contacting portion 52a that contacts and masks a window portion or region or area of the substrate during the coating process. Masking element 52 also includes a larger diameter or larger profile portion 52b at an opposite end of the masking element from the substrate. Thus, the masking element 52 provides a "mushroom-shaped" or "umbrella-shaped" masking element that covers or encompasses a window portion or region and a transition portion or region of the substrate during the coating process (such as during the vacuum-deposition or sputter coating of the metal thin film onto the rear substrate surface) and establishes a light transmitting window through the coating where the base or contacting portion 52a contacts the substrate surface during the coating process. The wider or larger portion 52b of masking element 52 (that is spaced from the substrate surface) limits direct, non-scattered, line-of-sight deposition of the coating material onto the substrate surface in the transition region immediately surrounding the base portion of the masking element and beneath the larger diffusing portion, while allowing some of the metal thin film material to be deposited in the transition region so as to establish a tapered material thickness of the deposited metal thin film or opaque material around the window.

The masking element thus functions to establish a non-uniform or non-sharp or gradient reflectance or coating or tapered coating around the window, such that the window is not as readily distinguishable or discernible to a person viewing the reflective element. Thus, rather than a conventional masking element that establishes a sharp edge window through the substrate coating, the present invention provides a coating or reflectance gradient or non-uniform reflectance or shadowing or "fuzziness" around the perimeter of the light transmitting window. The masking element may be retained in place at the substrate surface via any suitable retention means, such as adhesive or bridge-type masking elements or spring-loaded retaining mechanisms to urge the contacting portion of the masking element into engagement with the substrate surface or otherwise hold the masking element at or near the substrate surface, such as by utilizing aspects of the masking systems described in U.S. Pat. No. 7,255,451, which is hereby incorporated herein by reference in its entirety.

Optionally, and with reference to FIGS. 21-24, a masking element 152 extends from a bracket or support 154 of a substrate holding fixture 156 that supports one or more mirror substrates 150 during the sputter coating or vacuum-deposition process (such as during a one-sided or two-sided sputter-up or sputter-down vacuum-deposition process). Thus, the masking element 152 may be built into or incorporated into the substrate fixture, thereby enhancing the masking process. The holding fixture 156 may receive one or more substrates in respective holding or receiving portions of the fixture, and the bracket 154 may be placed over the fixture to retain the substrates in the fixture and to provide the masking element at or near the substrate surface. The fixture (with substrates and bracket) may then be placed in a vacuum-deposition chamber for coating one or both surfaces of the substrate.

As can be seen in FIGS. 21-24, when the mirror substrate 150 is supported by the substrate holding fixture 156 and the masking element 152 extends over a surface 150a of the respective substrate 150, the masking element is disposed over or spaced from the substrate surface so that the masking element provides a gradient coating or tapered thickness coating around the perimeter of the window established through the coating or layer on the substrate surface and at the transition region between the light transmitting window and the higher reflecting area at which the metal thin film coating is disposed. Optionally, the window region may have some amount of the coating material deposited over the entire window region, with a reduced amount at the central region of the window and a gradually thickening amount or tapered amount surrounding the slight or partial or reduced coating at the central region (so as to provide non-uniform reflectance or a reflectance gradient entirely across or substantially entirely across the window region). Optionally, if it is desired to remove any coating material that may be deposited at the central region of the window, the coating process may be followed by a laser ablation process or step of an etching process or step to locally remove the coating material from the central region of the window, while leaving the reflectance gradient or tapered coating at the transition area around the perimeter of the ablated or etched window.

In the illustrated embodiment, masking element 152 includes a stalk or arm portion 152a and a window establishing portion 152b. The window establishing portion 152b is sized to be large enough that, when spaced from the substrate surface a desired or appropriate or selected amount, the coating material may be partially disposed at the area of the substrate surface at which the window establishing portion 152b is located, but will be substantially not disposed or deposited at a central region of the area at which the window establishing portion 152b is located, thereby providing a tapered coating or reflectance gradient or non-uniform reflectance at the transition area at least partially surrounding the light transmitting window. The width of the arm portion 152a is preferably thin enough so that the coating is deposited over the substrate surface substantially entirely beneath and along the arm portion 152a during the coating process. Thus, the coated substrate has a window formed through the fourth surface metal thin film coating with a tapered thickness coating around the perimeter of the window, while the region of the substrate beneath the arm portion is substantially uniformly coated or at least coated in a manner that any difference in coating thickness or reflectance in that area is not readily discernible by a person viewing the mirror reflective element. Optionally, the masking element and/or bracket and/or substrate support fixture may utilize aspects of the masking systems described in U.S. Pat. No. 7,255,451, which is hereby incorporated herein by reference in its entirety.

Thus, a glass mirror substrate (such as a rear substrate for an electrochromic reflective element assembly) may be shape-cut and coated via a vacuum-deposition or sputter coating process (such as a top-down and/or bottom-up coating process that may coat one or both sides or surfaces of the substrate). Optionally, an opacifying layer or coating (such as, for example, a metal thin film or a non-conductive coating, such as a silicon-based semiconductive coating or the like, such as a silicon-aluminum coating or the like) may be coated or applied on a substrate. The substrate may be supported in a fixture and one or more masking elements may be disposed thereat (such as via a spring-loaded masking support or a stick-on pad or a magnetic masking element or the like, and such as by utilizing aspects of the masking elements and systems described in U.S. Pat. No. 7,255,451, which is hereby incorporated herein by reference in its entirety), whereby the masking elements may be removed after the coating process.

The front or third surface of the rear substrate may be coated with a transflective mirror reflector coating (such as a stack of multiple coatings such as described in U.S. Pat. Nos. 7,274,501; 7,255,451; and/or 7,184,190, which are hereby incorporated herein by reference in their entireties), while the rear or fourth surface may be coated or at least partially covered with an opacifying layer or coating with a window established at areas where a sensor or the like may be disposed behind the reflective element. If the window is established with a sharp edge, the window edge may be discernible in high lighting conditions (and the covertness of the window and thus of the sensor or the like disposed therebehind may be compromised). Thus, the present invention provides a gradient reflectance coating or tapered coating or a degree of shadowing around the perimeter edge of the window. Optionally, the coatings may be deposited on both substrate surfaces in a common vacuum-deposition process and/or in a common vacuum chamber. Optionally, an opacifying tape need not be disposed at the rear surface, and a low cost tape or film (such as a scatterproofing/shatterproofing hot melt layer formed from R101, a styrene butadiene rubber (SBR) polymer sold by Helmitin GmbH of Pirmasens, Germany, and adhered to the rear surface to prevent scattering of glass fragments and shards in the event of glass breakage during an accident or the like, such as described in U.S. Pat. Nos. 7,467,883 and/or 5,521,760, which are hereby incorporated herein by reference in their entireties) may be used to limit or substantially preclude shattering of the substrate. Thus, the present invention provides a reduced cost substrate coating process that provides enhanced covertness of a window at a rear surface for a sensor or the like to view through.

Optionally, such a fourth surface metal thin film coating (such as a chrome/chromium coating or the like) may not be needed, such as for a low cost or base electro-optic mirror reflective element assembly. For such a mirror reflective element assembly, there may not be a display device or video display or compass display or the like, so there may not be the same concerns with light generated by a display device being seen through the reflective element at locations remote from the display area. Thus, in such a base or non-mirror-display embodiment, the back lighting concerns may be limited to concerns with light (such as ambient light) coming from or originating due to an opening in the back of the mirror housing (such as an opening for a wire or a channel mount or the like), which may be sealed to limit or substantially preclude light entry into the mirror casing. Also, in such a lower cost base embodiment, the third surface transflective reflector coating may be partially transmissive, but may only need to be transmissive enough for a glare sensor (with its rearward field of view through the mirror reflective element assembly and through the third surface transflective reflector) to be functional, and may only need to be transmissive of light therethrough that is in the wavelength region that the photosensor has its peak sensitivity (typically a higher wavelength region, such as at an infrared or near-infrared range of the spectrum). Thus, a higher reflectivity, lower transmissivity third surface mirror reflector may be utilized on a base mirror reflective element assembly that does not include a display on demand type of display behind and viewable through the electro-optic or electrochromic mirror reflective element or mirror cell.

Figure 8:
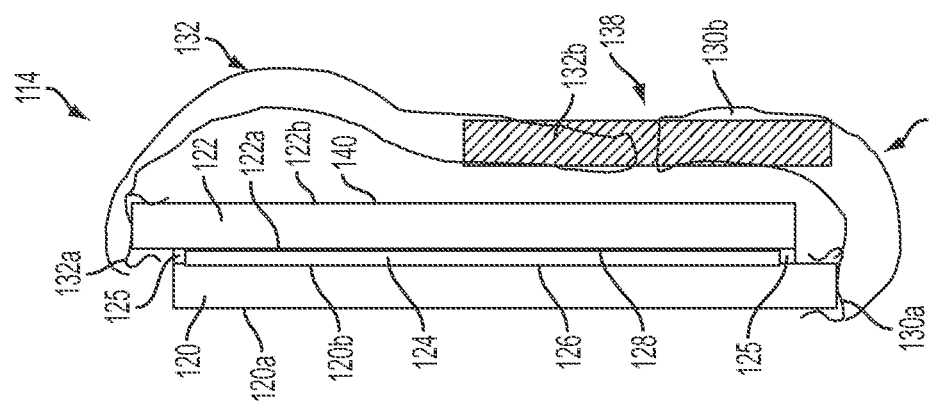
FIG. 8 is a side elevation and partial sectional view of the reflective element assembly of FIG. 7.
Figure 7:
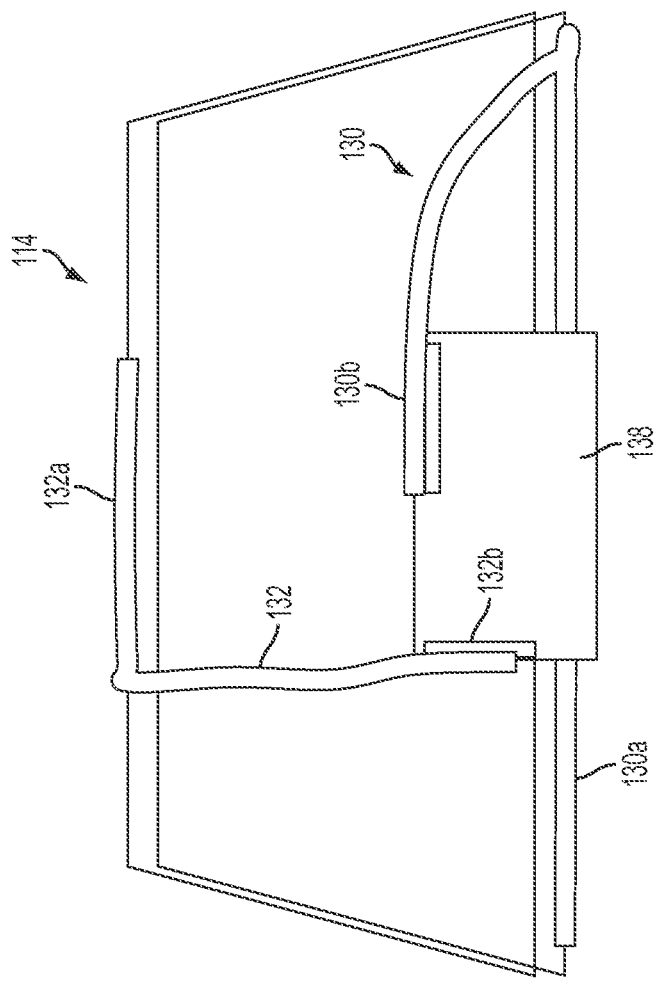
FIG. 7 is a perspective view of another reflective element assembly of the present invention.

Optionally, and with reference to FIGS. 7 and 8, a mirror reflective element assembly 114 includes a front substrate 120 and a rear substrate 122, with an electro-optic medium 124 (such as an electrochromic medium) disposed therebetween (and sealed or contained within the interpane cavity between the substrates 120, 122 via a perimeter seal 125). The front substrate 120 has a front or first surface 120a and a rear or second surface 120b, with a transparent conductive coating 126 established on second surface 120b, while the rear substrate 122 has a front or third surface 122a and a rear or fourth surface 122b, with a metallic reflector coating 128 established on third surface 122a (and optionally a chrome/chromium material or coating or other opaque reflective coating 140 established at the fourth surface 122b), such as in a similar manner as discussed above. An electrical connector 130 is conductively connected to the transparent conductive coating 126 at second surface 120b of front substrate 120, and another electrical connector 132 is conductively connected to the metallic reflector coating 128 at third surface 122a of rear substrate 122, whereby the electrical connectors are connected to a circuit element 138, such as a printed circuit board or the like, and electrical power is supplied to the coatings 126, 128 via connectors 130, 132 to vary the degree of dimming or darkening of the electro-optic medium 124.

In the illustrated embodiment, electrical connectors 130, 132 comprise elongated electrode clips, with one end portion 130a, 132a that clips over and along a perimeter edge region of the front and rear substrates 120, 122, respectively, and another end portion 130b, 132b that clips over and along a respective perimeter edge region of the circuit element 138. The clips or connectors 130, 132 may clip to the respective edges of the substrates as shown in FIG. 8, and may be bent or curved to extend away from the clipped edge region and toward the circuit element or circuit board 138. The end portions or clips 130b, 132b may be readily moved to generally align with an edge region of the circuit board and may be clipped thereto (such as by manually pressing the clips onto the circuit board or substrate), whereby electrical continuity is established between circuitry on the circuit element or board 138 (such as copper and/or solder exposed on the top and/or bottom of the circuit board that is conductively connected to appropriate circuitry) and the respective conductive coatings 126, 128 on the substrates 120, 122. In such an embodiment, the circuit board substrate and the coated glass substrates may have similar thicknesses (such as, for example, a thickness dimension of about 1.6 mm or thereabouts), so that the clip portions 130a, 130b and 132a, 132b may comprise continuous clip portions and thus may not include wires or other connectors attached to and extending between clip portions 130a, 130b or 132a, 132b.

Figure 10:
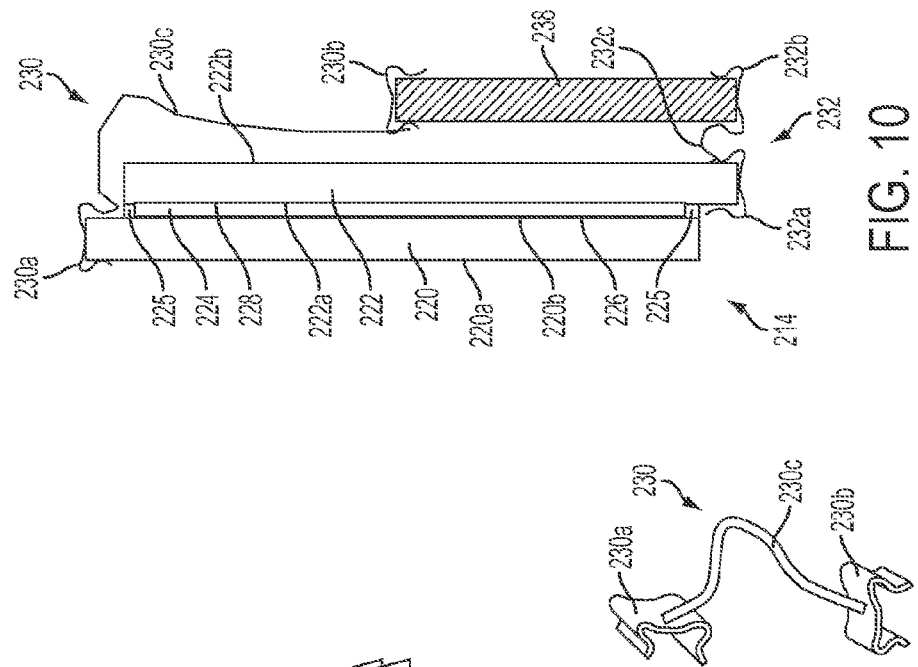
FIG. 10 is a side elevation and partial sectional view of the reflective element assembly of FIG. 9.
Figure 9:
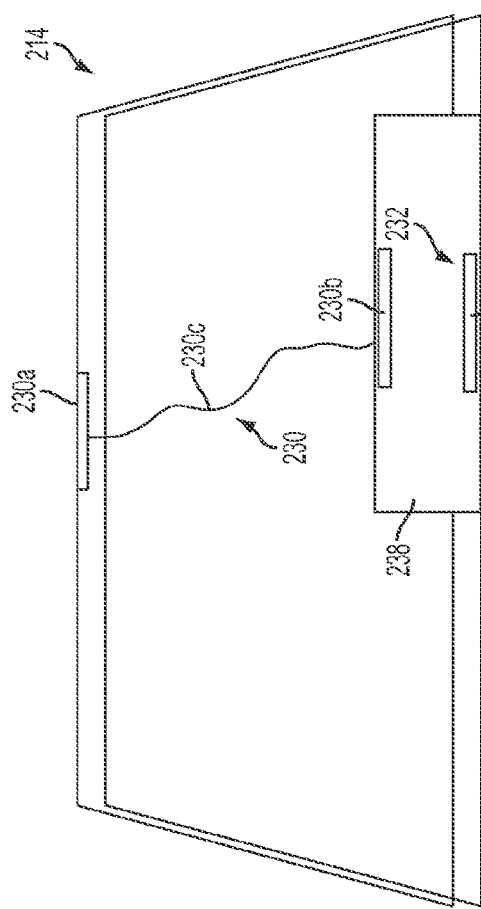
FIG. 9 is a perspective view of another reflective element assembly of the present invention.

Optionally, and with reference to FIGS. 9 and 10, a mirror reflective element assembly 214 includes a front substrate 220 and a rear substrate 222, with an electro-optic medium 224 (such as an electrochromic medium) disposed therebetween (and sealed or contained within the interpane cavity between the substrates 220, 222 via a perimeter seal 225). The front substrate 220 has a front or first surface 220a and a rear or second surface 220b, with a transparent conductive coating 226 established on second surface 220b, while the rear substrate 222 has a front or third surface 222a and a rear or fourth surface 222b, with a metallic reflector coating 228 established on third surface 222a (and optionally a chrome/chromium material or coating or other opaque reflective coating established at the fourth surface 222b), such as in a similar manner as discussed above. An electrical connector 230 is conductively connected to the transparent conductive coating 226 at second surface 220b of front substrate 220, and another electrical connector 232 is conductively connected to the metallic reflector coating 228 at third surface 222a of rear substrate 222, whereby the electrical connectors are connected to a circuit element 238, such as a printed circuit board or the like, and electrical power is supplied to the coatings 226, 228 via connectors 230, 232 to vary the degree of dimming or darkening of the electro-optic medium 224.

Figure 12:
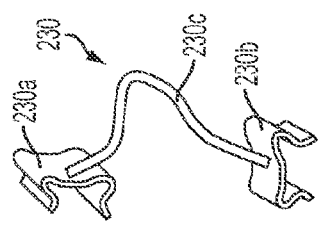
FIG. 12 is a perspective view of an electrical connector for electrically connecting to another edge of a substrate of the reflective element assembly and to the circuit element or board of the reflective element assembly.

In the illustrated embodiment, and as shown in FIGS. 10 and 12, electrical connector 230 comprises a pair of electrode clips 230a, 230b and an electrically conductive wire or lead 230c connected to the clips 230a, 230b. The clips 230a, 230b may be crimped onto the ends of the wire 230c or otherwise connected to the wire (such as via solder or the like). As shown in FIG. 10, one of the electrode clips 230a may clip over and along a perimeter edge region of the front substrate 220, while the other clip 230b may clip over and along a perimeter edge region of the circuit board 238, with the wire or lead 230c extending therebetween and allowing for flexibility in the connection process.

Figure 11B:
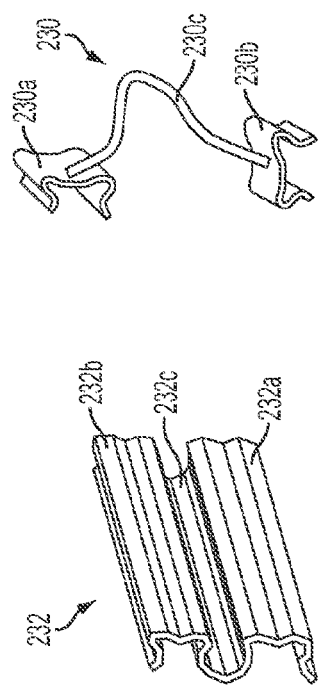
FIGS. 11A and 11B are perspective views of an electrode clip for electrically connecting to an edge of a substrate of the reflective element assembly and to a circuit element or board of the reflective element assembly.
Figure 11A:
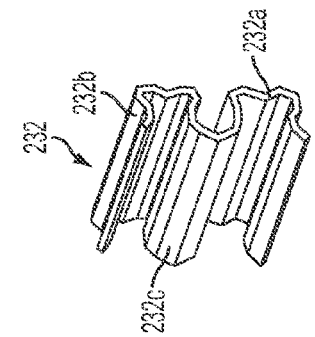

As shown in FIGS. 10, 11A and 11B, electrical connector 232 comprises a unitary metallic dual electrode clip, with a pair of clip portions 232a, 232b connected together by an intermediate web or connecting portion 232c. As shown in FIG. 10, one clip portion 232a may be connected or clipped to a perimeter edge region of the rear substrate 222, while the other clip 232b may be clipped over and along a perimeter edge region of the circuit board 238. In such an embodiment, the circuit board substrate and the coated glass substrates may have similar thicknesses (such as, for example, a thickness dimension of about 1.6 mm or thereabouts), so that the clip portions 230a, 230b and 232a, 232b may comprise common clip portions or designs or configurations. Optionally, the electrical connector 232 may be provided with different sized center connecting portions 232c to accommodate different sized cells or circuit elements or circuit board mounting configurations or the like.

Thus, an operator assembling the reflective element assembly may readily clip the clip portion 230a of electrical connector 230 to the front substrate 220 and the clip portion 230b to the circuit board 238 (such as by manually pressing the clips onto the front substrate and the circuit board). The clip portion 232a of electrical connector 232 may be clipped to the rear substrate 222, and then the circuit element 238 (with clip portion 230b already clipped thereto) may be readily moved toward and received in the clip portion 232b so as to establish electrical continuity between circuitry on the circuit element or board 238 (such as copper and/or solder exposed on the top and/or bottom of the circuit board that is conductively connected to appropriate circuitry) and the respective conductive coatings 226, 228 on the substrates 220, 222. Optionally, an operator may make the electrical connections in any other order, while remaining within the spirit and scope of the present invention. Optionally, and desirably, the clip 232a may be pressed onto the rear substrate and the clip and tab out portion at the third surface may be encapsulated.

Figures 13, 14, 15, 16:
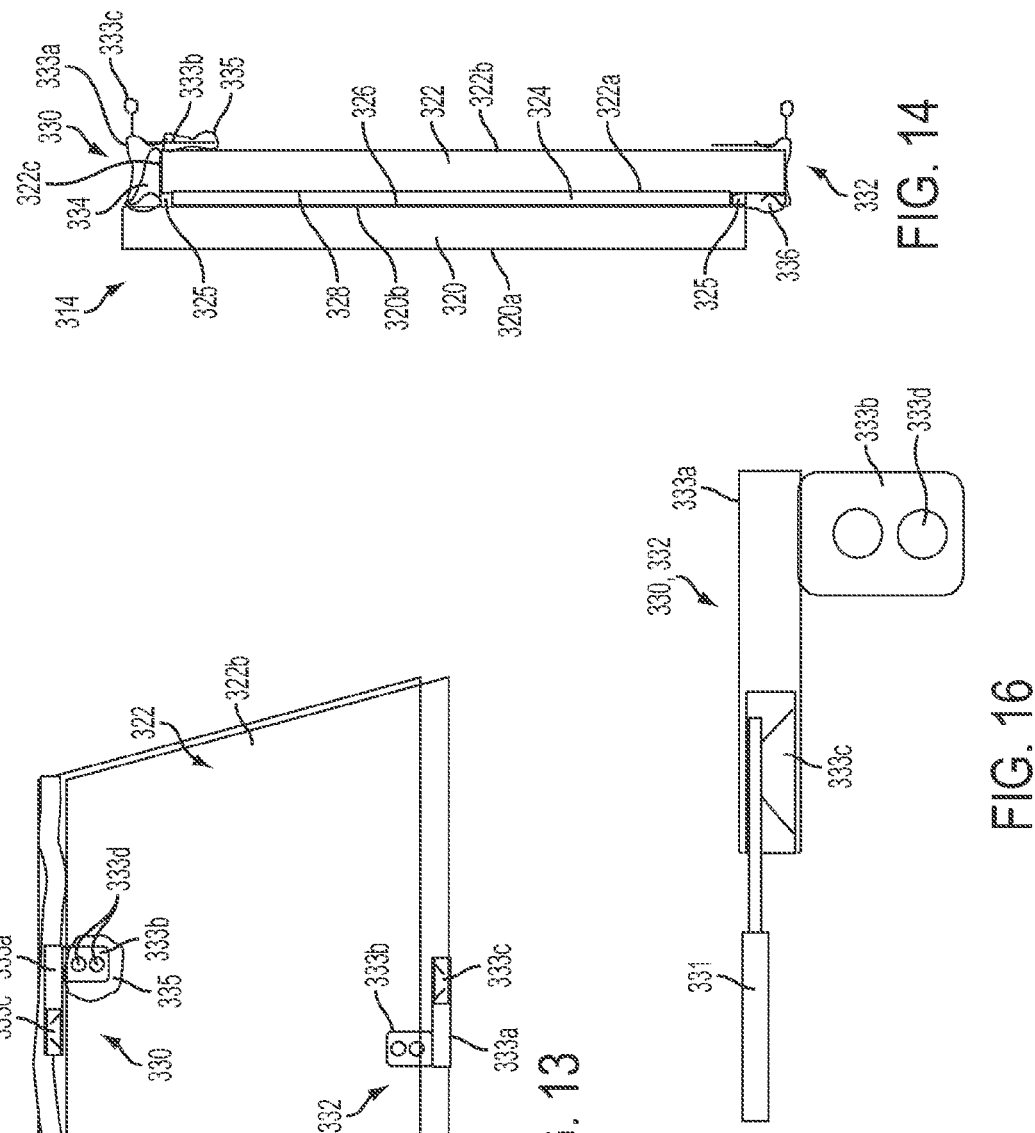
FIG. 13 is a perspective view of another reflective element assembly of the present invention.
FIG. 14 is a side elevation and partial sectional view of the reflective element assembly of FIG. 13.
FIG. 15 is a perspective view of an electrical connector for electrically connecting to a conductive coating of the reflective element assembly of FIGS. 13 and 14.
FIG. 16 is a plan view of the electrical connector of FIG. 15, shown with a conductive element or wire connected thereto.
Figure 17:
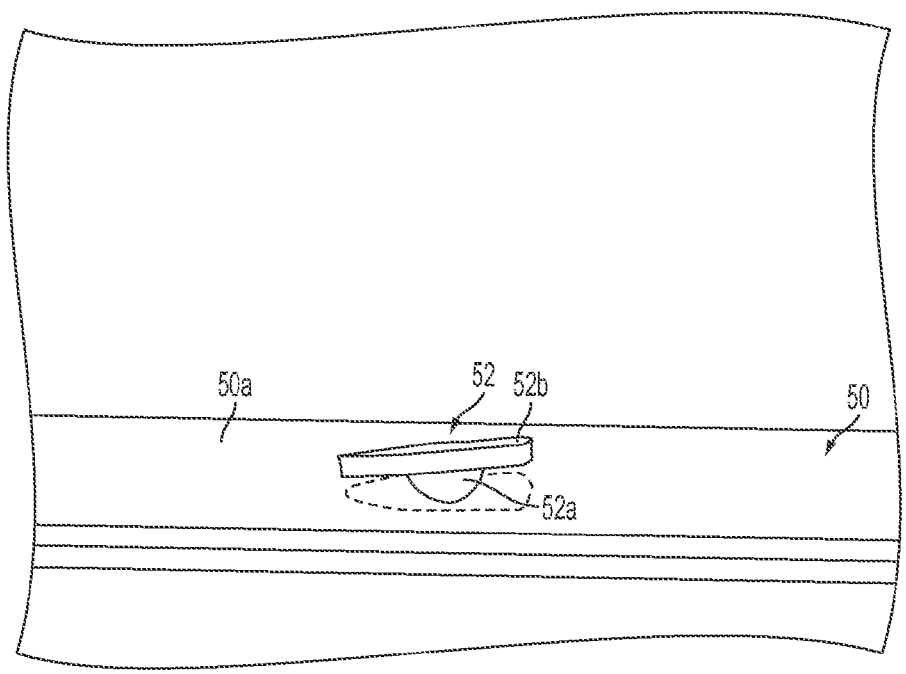
FIGS. 17-20 are views of a masking element that is disposed at a surface of a mirror substrate during a coating process in accordance with the present invention.
Figure 18:
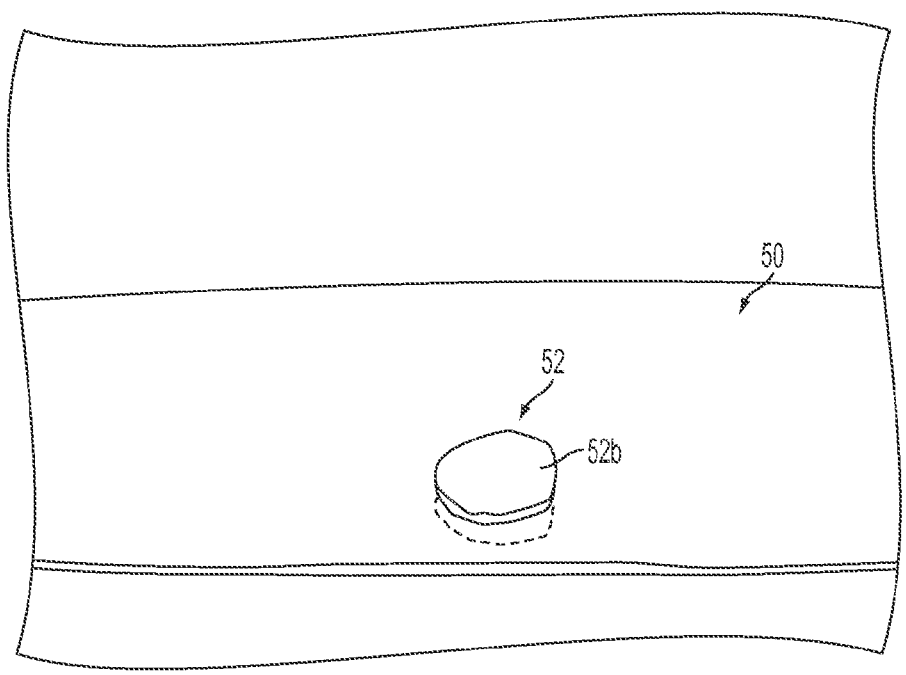
Figure 19:
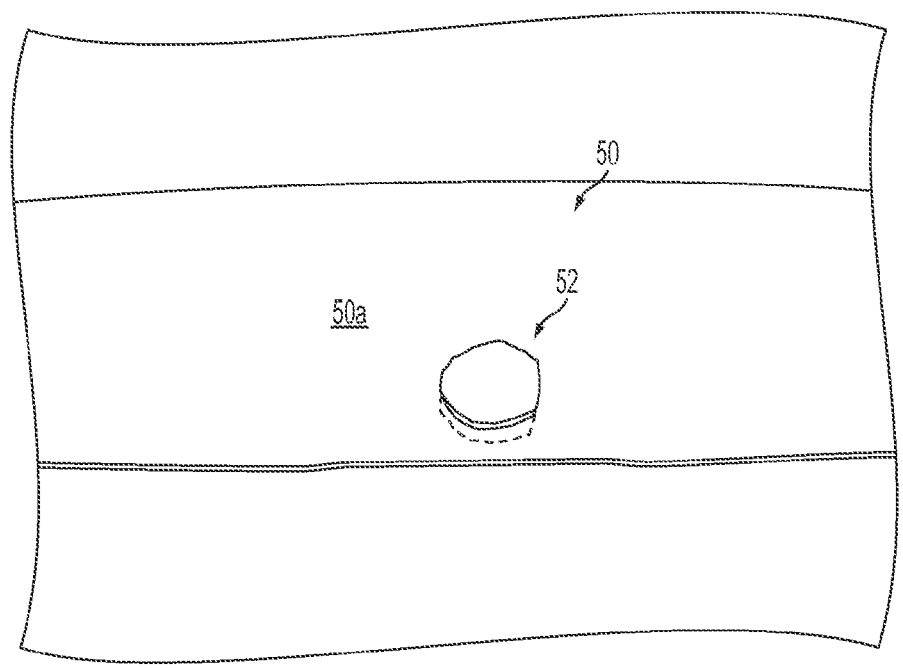
Figure 20:
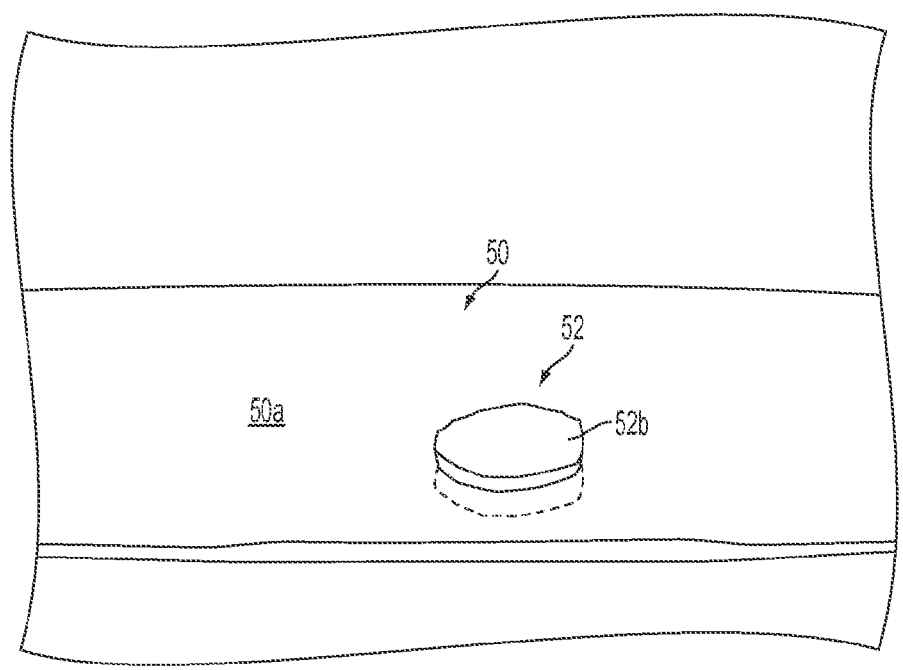
Figure 21:
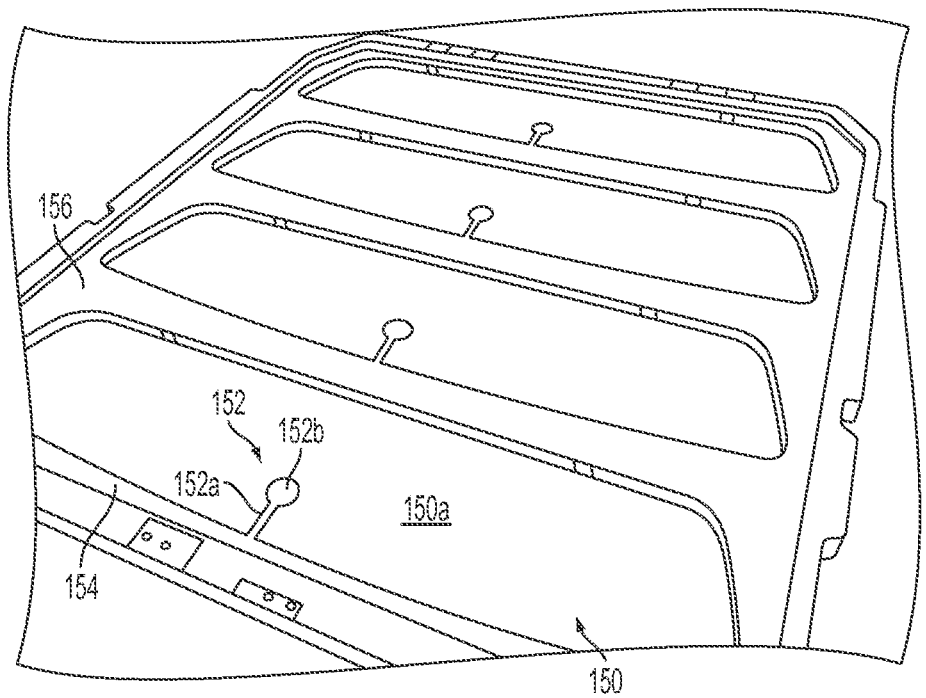
FIGS. 21-24 are views of another masking element that is disposed at a surface of a mirror substrate during a coating process in accordance with the present invention.
Figure 22:
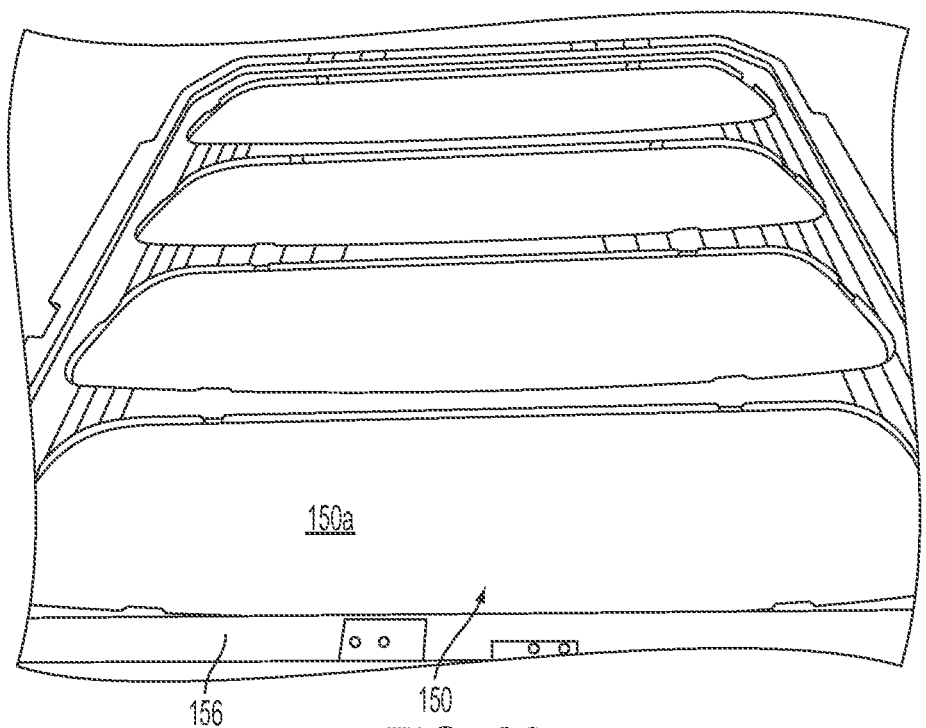
Figure 23:
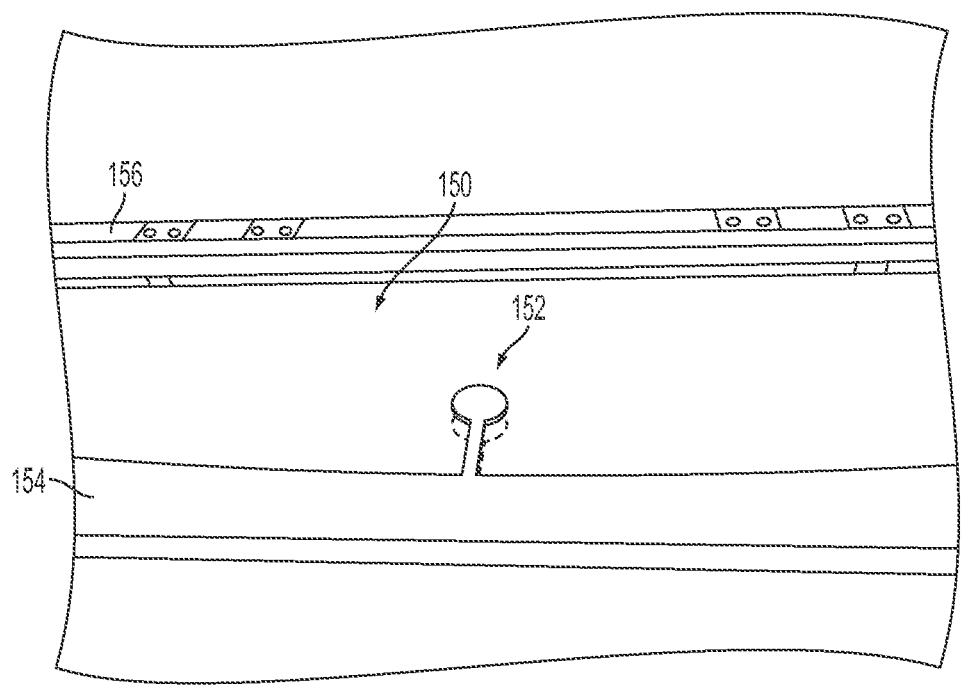
Figure 24:
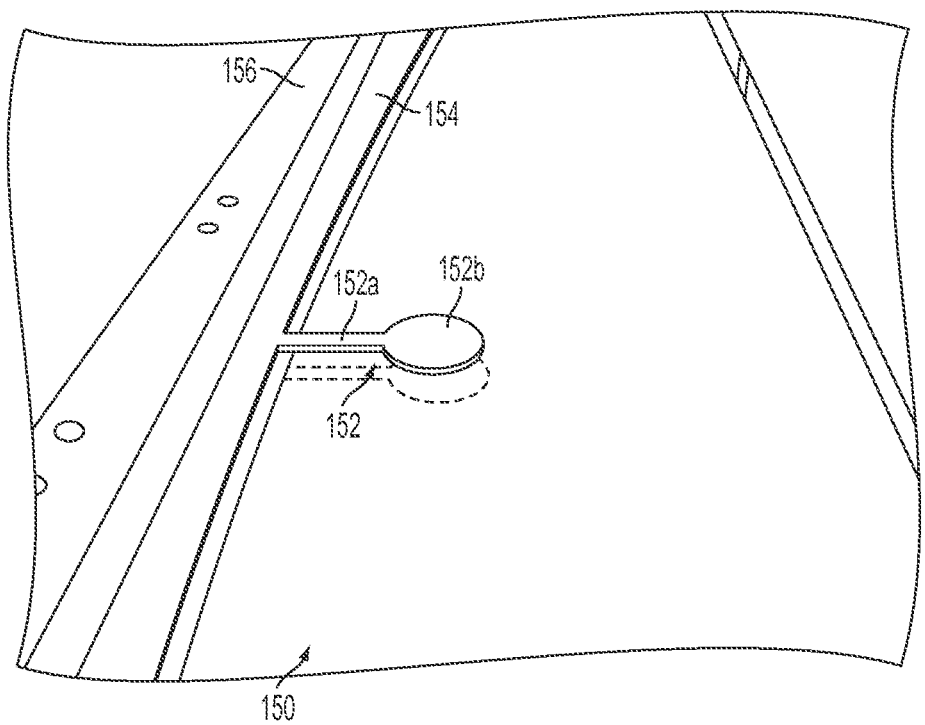

Optionally, and with reference to FIGS. 13 and 14, a mirror reflective element assembly 314 includes a front substrate 320 and a rear substrate 322, with an electro-optic medium 324 (such as an electrochromic medium) disposed therebetween (and sealed or contained within the interpane cavity between the substrates 320, 322 via a perimeter seal 325). The front substrate 320 has a front or first surface 320a and a rear or second surface 220b, with a transparent conductive coating 326 established on second surface 320b, while the rear substrate 322 has a front or third surface 322a and a rear or fourth surface 322b, with a metallic reflector coating 328 established on third surface 322a (and optionally a chrome/chromium material coating or other opaque reflective coating established at the fourth surface 322b), such as in a similar manner as discussed above. An electrical connector 330 is conductively connected to the transparent conductive coating 326 at second surface 320b of front substrate 320, and another electrical connector 332 is conductively connected to the metallic reflector coating 328 at third surface 322a of rear substrate 322, whereby the electrical connectors are connected to a circuit element (not shown in FIGS. 13 and 14), such as a printed circuit board or the like, and electrical power is supplied to the coatings 326, 328 via connectors 330, 332 to vary the degree of dimming or darkening of the electro-optic medium 324.

In the illustrated embodiment, electrical connectors 330, 332 comprise common connectors having the same construction, whereby common connector parts can be used for connecting to the second surface transparent conductive coating 326 and to the third surface conductive coating 328, thereby reducing part numbers in the manufacturing facility. Electrical connector 330, 332 comprises an electrode clip 333a and an attachment portion 333b and a connecting portion or crimp portion 333c. As shown in FIG. 15, attachment portion 333b is at about a 90 degree angle relative to clip portion 333a, so that when attachment portion 333b is at or on the rear or fourth surface 322b of rear substrate 322, the clip portion 333a extends along a perimeter edge portion or edge dimension of the rear substrate 322. The attachment portion 333b may include apertures 333d therethrough to enhance the adhesion and/or retention of the attachment portion 333b at the fourth surface 322b of the rear substrate 322. In the illustrated embodiment, the clip portion 333a may be similar to a standard sized clip (such as for clipping to a 1.6 mm thick glass substrate) or the like, and has the attachment portion 333b and wire connecting portion 333c extending therefrom (where the connector may be a stamped metallic part with the clip portion 333a, attachment portion 333b and connecting portion 333c unitarily formed or stamped or where the attachment portion 333b and connecting portion 333c may be attached to or otherwise formed with clip portion 333a).

A wire or lead 331 (FIG. 16) may be electrically conductively connected to connecting portion 333c of electrical connector 330, 332, such as by inserting a lead end or terminal end of the wire into a receptacle. Optionally, and desirably, the wire attachment to the connecting portion may be a solderless push-in connection that does not require any soldering or crimping to secure the wire at the connector and to establish electrical conductivity at the connection.

Optionally, the connection of the wire to the connecting portion may be crimped and/or soldered as well, such as by crimping the receptacle at the wire end to secure and conductively connect the wire to the electrical connector. Optionally, and desirably, the connecting portion 333c may be configured to allow for insertion of the wire 331 from either end of the connecting portion to adapt the connector for different applications and/or connection at different sides or regions of the reflective element. The connecting portion 333c thus may receive the end of the wire to be conductively connected to the end of the wire, or the connecting portion may be crimped to a wire or otherwise connected to a wire (such as via solder or the like) to establish electrical continuity at the connection, and the opposite end of the wire may be connected to a clip or terminal, such as a spade terminal or plug/socket connector of a wire harness or the like, at a circuit element or circuit board or the like. Optionally, the connecting portion of the electrical connector may comprise any suitable connector, such as a spade terminal or the like, and may allow for manual connection or insertion without soldering of the wire to the connecting portion, while remaining within the spirit and scope of the present invention.

Thus, and as shown in FIG. 14, electrical connector 330 may electrically conductively connect to the transparent conductive coating 326 at second surface 320b of front substrate 320. For example, clip portion 333a of electrical connector 330 may be disposed at the overhang region of front substrate 320, but may not be clipped to or may not receive the perimeter edge portion or region 322c of rear substrate 322. A conductive material 334 (such as a conductive potting material or conductive epoxy or the like) may be disposed at the overhang region and encapsulate clip portion 333a and conductively connect clip portion 333a to transparent conductive coating 326. Perimeter seal 325 may electrically and conductively isolate clip portion 333a and conductive material 334 from conductive coating 328 at third surface 322a of rear substrate 322, such as in a similar manner as discussed above. An adhesive or bonding material 335 may be disposed at fourth surface 322b of rear substrate 322 to adhere attachment portion 333b and electrical connector 330 to the rear substrate 322.

Electrical connector 332 may electrically conductively connect to third surface conductive coating 328 by clipping to or receiving an edge portion 322d of rear substrate, such as in a similar manner as described above. The rear substrate 322 may include a tab out coating or layer that is conductively connected to the third surface conductive coating 328 and that provides for electrical conductive connection to the third surface conductive coating 328 at a perimeter region of the rear substrate that is outboard of the perimeter seal 325, such as in a similar manner as also described above. As shown in FIG. 14, the clip portion 331a of electrical connector 332 may be encapsulated (such as by any suitable encapsulant 336) at the third surface of the rear substrate to seal the electrical connection at the third surface tab out portion of the reflective element.

During assembly of the reflective element assembly, the electrical connector 330 may have its clip portion 333a inserted into the conductive epoxy 334 and its attachment portion 333b adhered or bonded at the fourth surface 322b of rear substrate 322 via an adhesive or bonding material 335. The end of a wire or lead may be inserted into or otherwise connected to connecting portion 333c and the opposite end of the wire or lead may be connected to a circuit element or circuit board or wire harness or the like. The other electrical connector 332 may be readily pressed onto the edge region of the rear substrate to electrically conductively connect the clip portion 333a to the third surface conductive coating 328 at rear substrate 322. Optionally, the attachment portion 333b of electrical connector 332 may be adhered at the fourth surface of the rear substrate, but the adhesive may not be necessary due to the positive clip attachment at the perimeter edge of the rear substrate. The end of another wire or lead may be inserted into or otherwise connected to connecting portion 333c of electrical connector 332 and the opposite end of the wire or lead may be connected to a circuit element or circuit board or wire harness or the like.

Thus, the electrical connectors 330, 332 may comprise a common part or stamping and may enhance the volume of the custom stamping and communize the assembly equipment. The same clip may be used for connecting to both conductive coatings (on the second surface of the front substrate and the third surface of the rear substrate).

Optionally, other electrical connectors may be used for electrical connection to the transparent conductive coating at the second surface of the front substrate, while the electrical connector 332 may clip to the edge of the rear substrate as described above. For example, and with reference to FIGS. 28-32, an electrical connector 330' may include an electrically connecting portion 333a', an attachment portion 333b' and a wire connecting portion or crimp portion 333c'. Attachment portion 333b' extends between the electrically connecting portion 333a' and the wire connecting portion 333c', so that when electrically connecting portion 333a' is at or on or in contact with a conductive medium (such as a conductive epoxy or the like) established at an overhang region and between the connecting portion 333a' and the transparent conductive coating at the rear or second surface of the front substrate, the attachment portion 333b' extends along the rear or fourth surface of the rear substrate (and is adhered or secured thereto) and the wire connecting portion 333c' is disposed at or along the rear or fourth surface of the rear substrate. The attachment portion 333b' may include apertures 333d' therethrough to enhance the adhesion and/or retention of the attachment portion 333b' (via an adhesive disposed at the fourth surface in the area at which the connector 330' is disposed) at the fourth or rear surface of the rear substrate. Optionally, the connector may be a stamped metallic part with the connecting or contacting portion 333a', attachment portion 333b' and connecting portion 333c' unitarily formed or stamped or the connecting portions may be otherwise attached to or otherwise formed with the attachment portion).

A wire or lead (not shown in FIGS. 28-32) may be electrically conductively connected to connecting portion 333c' of electrical connector 330', such as by inserting a lead end or terminal end of the wire into a receptacle of wire connecting portion 333c'. Optionally, and desirably, the wire attachment to the connecting portion may be a solderless push-in connection that does not require any soldering or crimping to secure the wire at the connector and to establish electrical conductivity at the connection. Optionally, the connection of the wire to the connecting portion may be crimped and/or soldered as well, such as by crimping the receptacle at the wire end to secure and conductively connect the wire to the electrical connector. Optionally, and desirably, the connecting portion 333c' may be configured to allow for insertion of the wire from either end of the connecting portion to adapt the connector for different applications and/or connection at different sides or regions of the reflective element. The connecting portion 333c' thus may receive the end of the wire to be conductively connected to the end of the wire and may include flexible tabs 333e' that allow for insertion of the wire into the connecting portion 333c' and that contact the exposed wire to electrically conductively connect the wire to the connector, while limiting or substantially precluding retraction of the wire from the connecting portion, or the connecting portion may be crimped to a wire or otherwise connected to a wire (such as via solder or the like) to establish electrical continuity at the connection. The opposite end of the wire may be connected to a clip or terminal, such as a spade terminal or plug/socket connector of a wire harness or the like, at a circuit element or circuit board or the like. Optionally, the connecting portion of the electrical connector may comprise any suitable connector, such as a spade terminal or the like, and may allow for manual connection or insertion without soldering of the wire to the connecting portion, while remaining within the spirit and scope of the present invention.

Thus, electrical connector 330' may electrically conductively connect to the transparent conductive coating at the rear or second surface of the front substrate (such as the front substrate 320 of reflective element assembly 314 of FIGS. 13 and 14). For example, connecting portion 333a' of electrical connector 330' may be disposed at the overhang region of the front substrate, but not clipped to the perimeter edge portion or region of the rear substrate. A conductive material (such as a conductive potting material or conductive epoxy or the like) may be disposed at the overhang region and encapsulate connecting portion 333a' and contact the transparent conductive coating at the rear surface of the front substrate to conductively connect the connector 330' to the transparent conductive coating at the rear surface of the front substrate. The perimeter seal of the reflective element assembly may electrically and conductively isolate the connector 330' and the conductive material from the conductive coating at the third or front surface of the rear substrate, such as in a similar manner as discussed above. An adhesive or bonding material may be disposed at the fourth surface of the rear substrate and at the attachment portion 330b' to adhesively bond the connector at the rear substrate of the reflective element.

Figure 33:
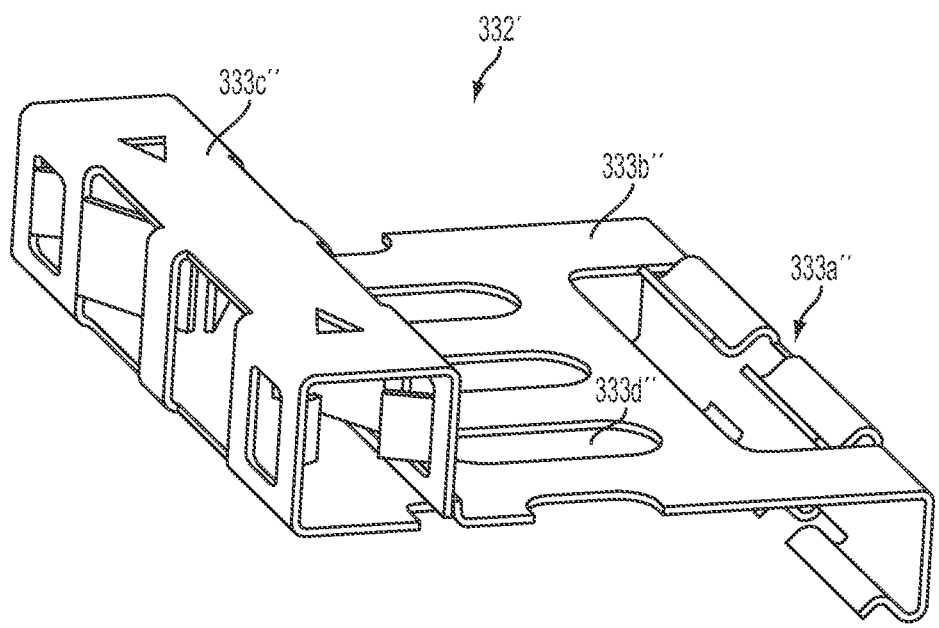
FIG. 33 is a perspective view of another electrical connector for electrically connecting to a conductive coating of the reflective element assembly of the present invention.
Figure 34:
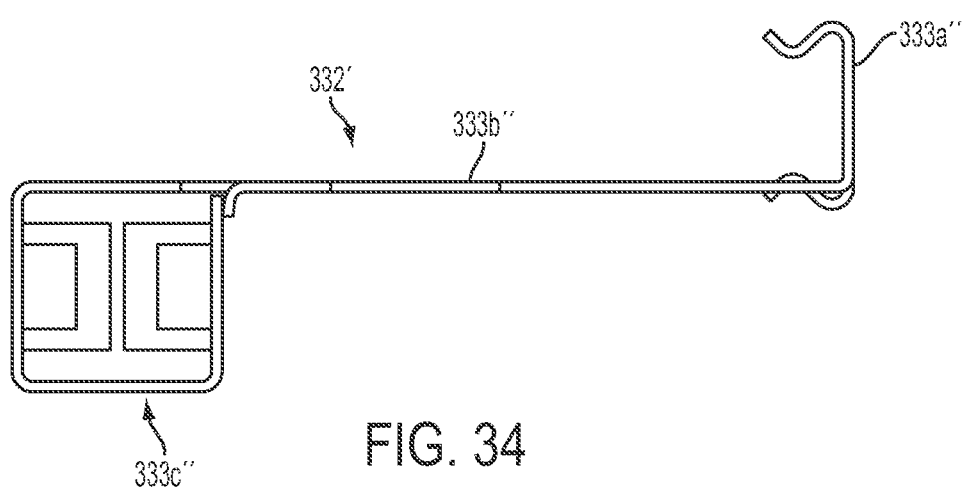
FIG. 34 is a plan view of the electrical connector of FIG. 33.

Optionally, the electrical connector for electrically conductively connecting to the conductive coating at the third or front surface of the rear substrate may be similar in construction to connector 330', discussed above. For example, and with reference to FIGS. 33 and 34, an electrical connector 332' may include an electrically connecting portion or clip 333a", an attachment portion 333b" and a wire connecting portion or crimp portion 333c". Attachment portion 333b" extends between the electrically connecting clip 333a" and the wire connecting portion 333c", so that when electrically connecting clip 333a" is clipped to the perimeter edge region of the rear substrate such that electrical conductivity is established between the connector 332' and the third surface conductive coating, the attachment portion 333b" extends along the rear or fourth surface of the rear substrate (and is adhered or secured thereto) and the wire connecting portion 333c" is disposed at or along the rear or fourth surface of the rear substrate. The attachment portion 333b" may include apertures 333d" therethrough to enhance the adhesion and/or retention of the attachment portion 333b" (via an adhesive disposed at the fourth surface in the area at which the connector 332' is disposed) at the fourth or rear surface of the rear substrate. Optionally, the connector may be a stamped metallic part with the connecting or contacting portion 333a", attachment portion 333b" and connecting portion 333c" unitarily formed or stamped or the connecting portions may be otherwise attached to or otherwise formed with the attachment portion). The connector 332' thus may clip to the perimeter edge region of the rear substrate to establish electrical conductivity between the wire connecting portion and the third surface conductive coating on the front or third surface of the rear substrate of the reflective element, but may otherwise be similar in construction to electrical connector 330', discussed above, such that a detailed discussion of the electrical connectors need not be repeated herein.

Figure 38:
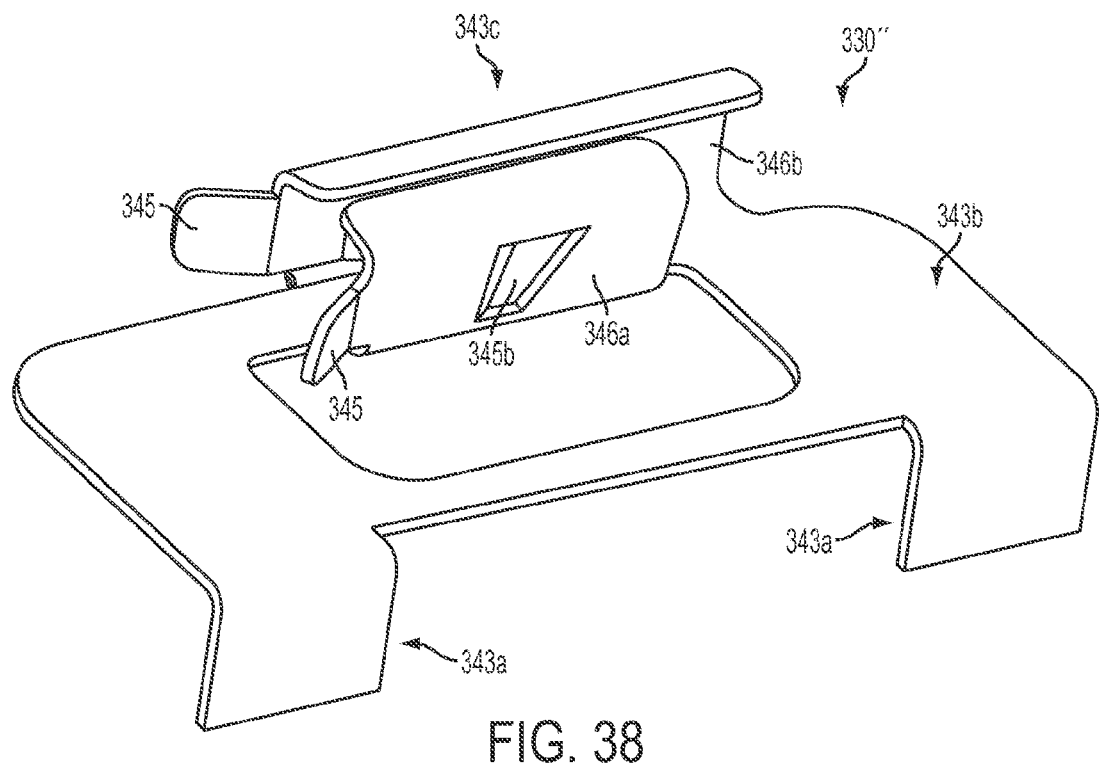

Optionally, an electrically conductive connector 330" (FIG. 38) may include an electrically connecting portion or tab or tabs 343a, an attachment portion 343b and a wire connecting portion or crimp portion 343c. Attachment portion 343b extends between the electrically connecting portion 343a and the wire connecting portion 343c, so that when electrically connecting portion 343a is at or on or in contact with a conductive medium (such as a conductive epoxy or the like) established at an overhang region and at or between the connecting portion 343a and the transparent conductive coating at the rear or second surface of the front substrate, the attachment portion 343b extends along and/or from the rear or fourth surface of the rear substrate (and is adhered or secured thereto) and the wire connecting portion 343c is disposed at or along (or spaced from) the rear or fourth surface of the rear substrate, such as in a similar manner as discussed above with respect to electrically conductive connector 330'. Optionally, the connector 330" may comprise a stamped metallic part with the connecting or contacting portion 343a, attachment portion 343b and connecting portion 343c unitarily formed or stamped or the connecting portions may be otherwise attached to or otherwise formed with the attachment portion).

Figure 35:
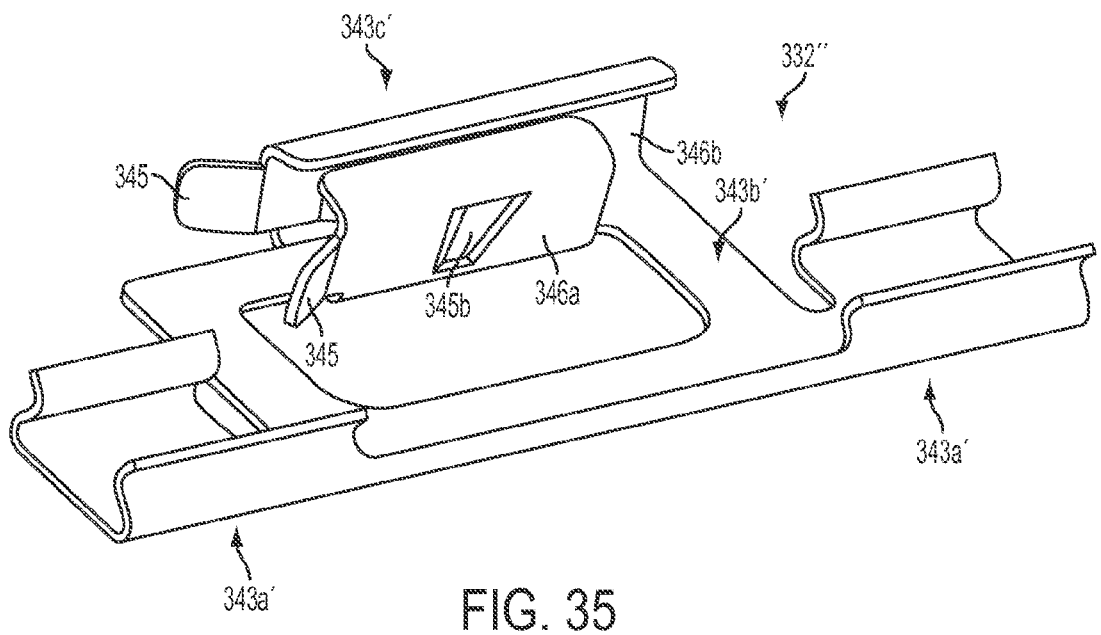
FIG. 35 is a perspective view of another electrical connector for electrically connecting to a conductive coating of a reflective element assembly in accordance with the present invention, such as via clipping to an edge region of a rear substrate of the reflective element assembly.
Figure 36:
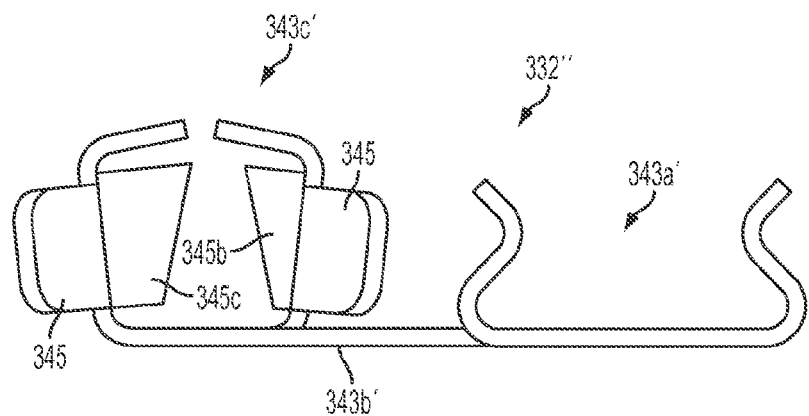
FIG. 36 is an end elevation of the electrical connector of FIG. 35.
Figure 37:
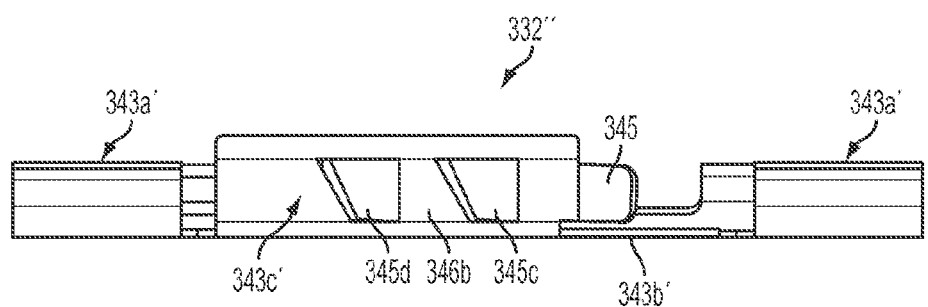
FIG. 37 is a top view of the electrical connector of FIG. 35.

Also, an electrical connector 332" (FIGS. 35, 36 and 37) for electrically conductively connecting to the electrically conductive coating at the third surface or front surface of the rear substrate of an electrochromic reflective element may include an electrically connecting portion or clip 343a', an attachment portion 343b' and a wire connecting portion or crimp portion 343c'. Attachment portion 343b' extends between the electrically connecting clip 343a' and the wire connecting portion 343c', so that when electrically connecting clip 343a' is clipped to the perimeter edge region of the rear substrate such that electrical conductivity is established between the connector 332" and the third surface conductive coating, the attachment portion 343b' extends from the rear or fourth surface of the rear substrate and the wire connecting portion 343c' is disposed at or along (or spaced from) the rear or fourth surface of the rear substrate. Optionally, the connector 332" may comprise a stamped metallic part with the connecting or contacting portion 343a', attachment portion 343b' and connecting portion 343c' unitarily formed or stamped or the connecting portions may be otherwise attached to or otherwise formed with the attachment portion). The connector 332" thus may clip to the perimeter edge region of the rear substrate to establish electrical conductivity between the wire connecting portion and the third surface conductive coating on the front or third surface of the rear substrate of the reflective element, but may otherwise be similar in construction to electrical connector 330", such that a detailed discussion of the electrical connectors need not be repeated herein. Thus, instead of using the same part and orienting the part in a different way (such as discussed below with respect to connector 530), the connectors 330", 332" comprise different parts. The different parts may have similar wire connecting portions and attachment portions, with different substrate connecting portions, and may be formed with the same stamping tool with some changeable inserts to form the alternate construction of the substrate connecting portions.

Figure 39:
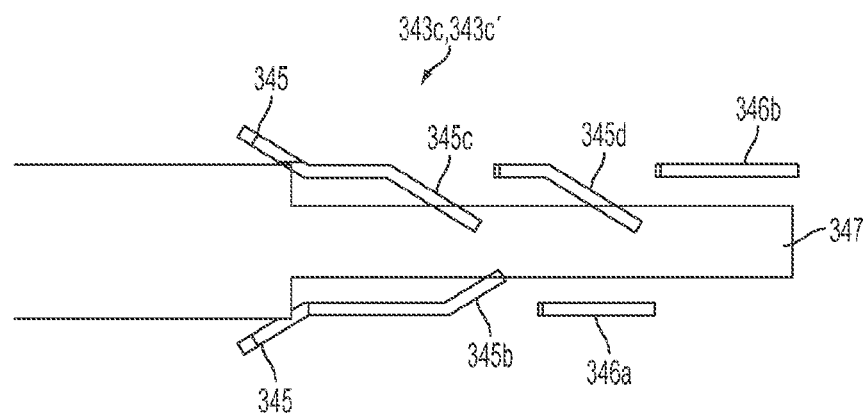
FIG. 39 is a sectional view of the wire connecting portions of the electrical connectors of FIGS. 35 and 38.

In the illustrated embodiments, the wire connecting portions 343c, 343c' of electrically conductive connectors 330", 332" comprise a wire receiving element for receiving an end of a wire or lead 347 inserted into the wire connecting portion. The wire connecting portions 343c, 343c' may provide for receiving the ends of wires in one direction (and may not provide for insertion of the wire into the connecting element from either direction). As shown in FIG. 39, wire connecting portion 343c, 343c' comprises a pair of flared tabs 345a to help guide the wire into the receptacle or contact area of the connecting portion or element. Wire connecting portion 343c, 343c' includes a contact spring element, which may extend inward from one or more of the walls of the connecting portion 343c, 343c'. For example, the wire connecting portion 343c, 343c' may include three contact spring elements or features 345b, 345c, 345d that extend inward from respective walls or wall portions 346a, 346b of wire connecting portion 343c, 343c'. The spring elements 345b-d may be cut or stamped or otherwise formed at an angle to help force the wire toward the base of the part and avoid the wire from sliding or popping out or retracting when the two main sides or walls 346a, 346b of the connector may flex open a little during wire insertion. Optionally, and desirably, the contact edges of the tabs 345b-d may comprise cut edges or sharp edges for optimum wire retention and bite into the wire that is inserted into the wire connecting portion 343c, 343c' of connectors 330", 332".

Optionally, and desirably, a conductive epoxy may be disposed along the edge of the substrate and may wrap onto the rear or fourth surface of the rear substrate. The connector may be held in place at the conductive epoxy and the epoxy may be cured to hold the connector at the glass substrate. The conductive epoxy thus may provide mechanical anchoring and environmental protection or sealing and electrical connection at the connection of the connector to the conductive coatings. Thus, a preformed metallic connector may be adhered to the substrate and electrically connected or conductively connected to the conductive coating via a conductive epoxy or the like.

Therefore, the present invention provides an electrical connector that may clip onto a perimeter edge of the rear substrate and an electrical connector that may be disposed at an overhang region with electrically conductive continuity established between the connector and the transparent conductor coating at the rear surface of the front substrate via a conductive epoxy or the like. The electrical connector may solderlessly connect to a wire via insertion of the wire into the wire receiving or connecting portion of the connector (and the connecting portion may retain the wire therein via flexible tabs or the like or the connecting portion may be crimped or otherwise adapted to retain the wire within the connecting portion). Thus, for example, one electrical connector may be disposed at and clipped at a perimeter region of the rear substrate and may establish electrically conductive continuity to a tab-out portion of the metallic conductive reflector coating at the front surface of the rear substrate, while another electrical connector may be disposed at the rear of the front substrate (such as at an overhang region or offset region where a dimension of the front substrate extends beyond a corresponding dimension of the rear substrate), whereby electrically conductive continuity may be established between the connector and the transparent conductive coating at the rear surface of the front substrate, such as via a conductive epoxy or the like. A first wire or lead may thus make an electrical connection to the first electrical connector and thus to the third surface conductor coating (and may provide, for example, a negative wire or terminal or connection) while another wire or lead may make electrical connection to the second electrical connector and thus to the second surface transparent conductive coating. For example, the other or second wire may comprise a positive terminal or wire or connection and may be electrically conductively connected to the second surface transparent conductive coating via a conductive epoxy that is dispensed or disposed at or over a portion of the electrical connector at the overhang region (such as at a small step or flange in the stamped electrical connector that establishes or supports the wire at or rearward of the fourth surface of the rear glass substrate so as to give clearance for equipment to dispense the conductive epoxy at and at least partially over the connecting portion of the electrical connector).

Optionally, an electrical connector may be used to clip to the edge of the rear substrate (such as described above) or to establish electrically conductive continuity to the electrically conductive coating at the rear surface of the front substrate (such as via a conductive epoxy or the like). For example, and with reference to FIGS. 40-42, an electrical connector 530 may include an electrically connecting portion or substrate connecting portion or clip portion 533a, an attachment portion 533b and a wire connecting portion or crimp portion 533c. Attachment portion 533b extends between the electrically connecting portion 533a and the wire connecting portion 533c, so that when electrically connecting portion 533a is at or on or in contact with a conductive medium (such as a conductive epoxy or the like) established at an overhang region and between or at the connecting portion 533a and the transparent conductive coating at the rear or second surface of the front substrate (such as shown in FIG. 41), the attachment portion 533b extends along or from the rear or fourth surface of the rear substrate and the wire connecting portion 533c is disposed at or along the rear or fourth surface of the rear substrate (and may be adhered or secured thereto). Likewise, when the connector 530 is used to clip onto the perimeter edge region or portion of a rear substrate to establish electrically conductive continuity to an electrically conductive coating at the front surface of the rear substrate, the attachment portion 533b extends generally along or from the rear or fourth surface of the rear substrate, and the wire connecting portion 533c may be spaced from the rear or fourth surface of the reflective element (such as shown in FIG. 42). Optionally, the connector may be a stamped metallic part with the connecting or contacting portion 533a, attachment portion 533b and connecting portion 533c unitarily formed or stamped or the connecting portions may be otherwise attached to or otherwise formed with the attachment portion).

A wire or lead (not shown in FIGS. 40-42) may be electrically conductively connected to connecting portion 533c of electrical connector 530, such as by inserting a lead end or terminal end of the wire into a receptacle of wire connecting portion 533c. Optionally, and desirably, the wire attachment to the connecting portion may be a solderless push-in connection that does not require any soldering or crimping to secure the wire at the connector and to establish electrical conductivity at the connection. In the illustrated embodiment, the wire connecting portion 533c comprises a primary connecting element 540 at each end of the connecting portion 533c (so that a wire may be inserted into the connecting portion from either direction with respect to the wire connecting portion 533c of electrical connector 530 and establish a primary electrically conductive connection between the wire and the connecting element 540) and a secondary connecting element 542 at a generally central region of the connecting portion 533c (so that a secondary electrical connection or contact may be made to a wire inserted into the connecting portion 533c). Optionally, the connection of the wire to the connecting portion may be crimped and/or soldered as well, such as by crimping the receptacle at the wire end to secure and conductively connect the wire to the electrical connector.

Figure 40:
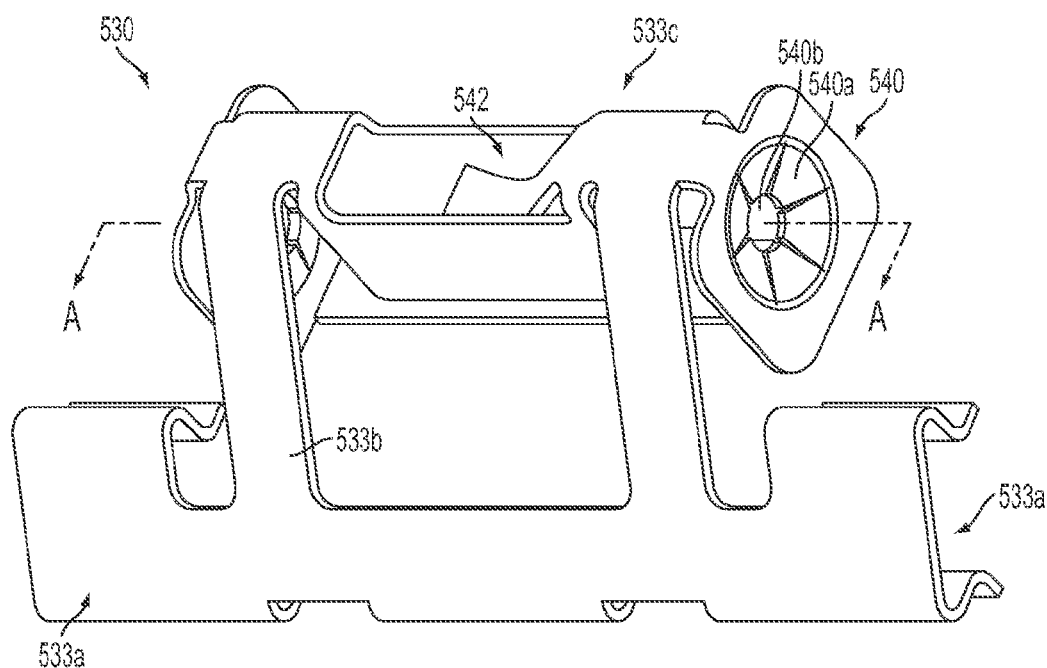
FIG. 40 is a perspective view of another electrical connector for electrically connecting to a conductive coating of a reflective element assembly in accordance with the present invention.
Figure 40A:
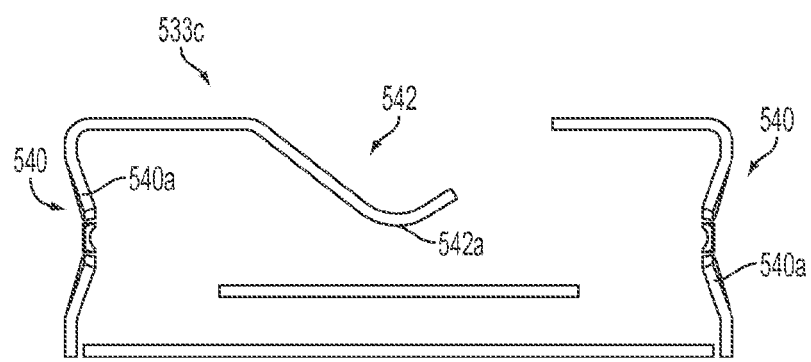
FIG. 40A is a sectional view of the wire connecting portion of the electrical connector, taken along the line A-A in FIG. 40.
Figure 41:
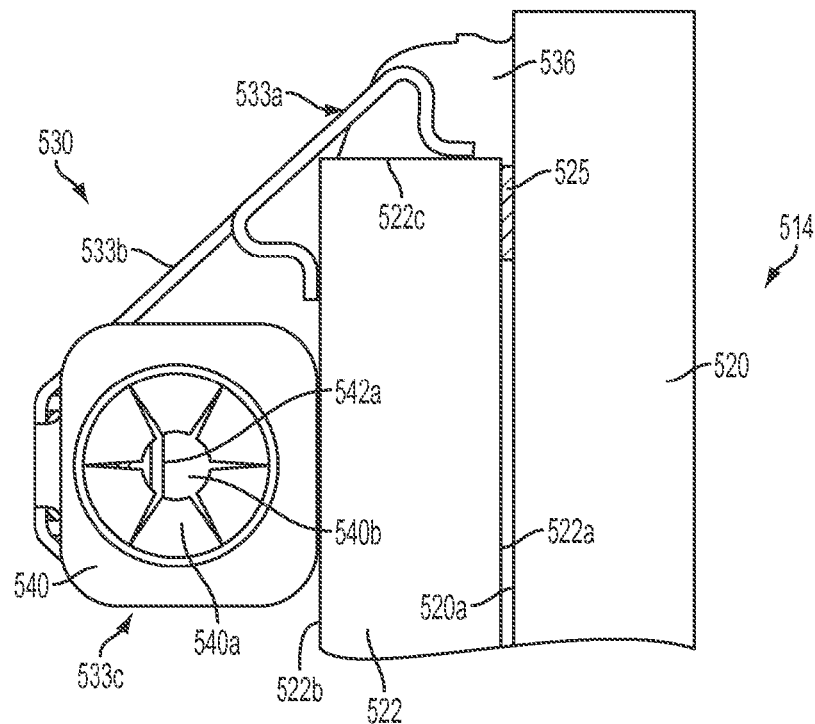
FIG. 41 is an end view of the electrical connector of FIG. 40, shown attached to a reflective element and in electrical conductive continuity with an electrically conductive coating at a rear surface of the front substrate of the reflective element.
Figure 42:
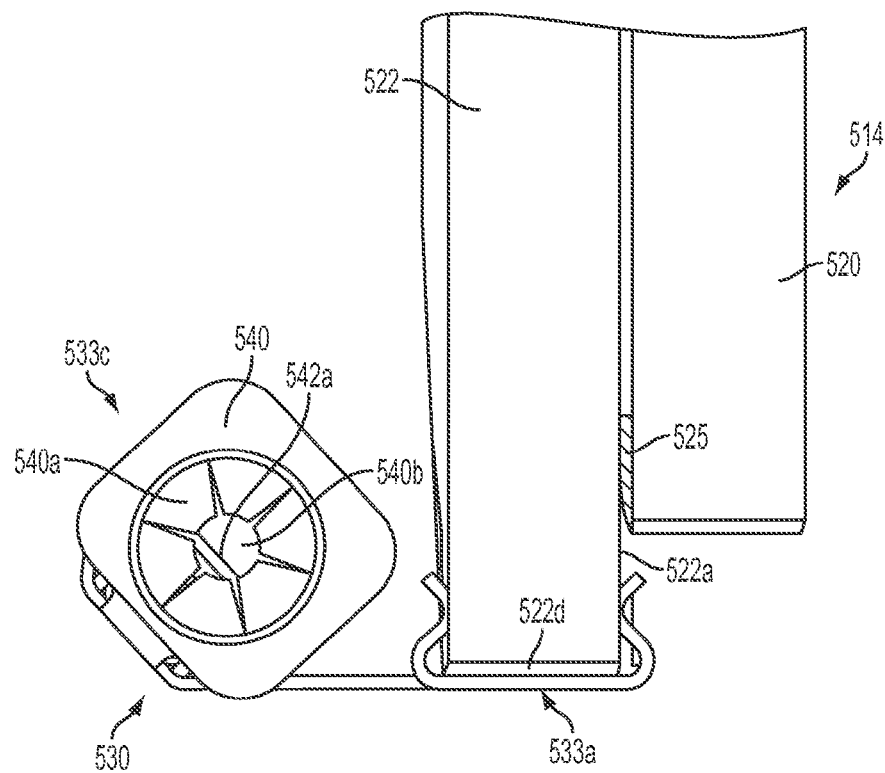
FIG. 42 is an end view of the electrical connector of FIG. 40, shown attached to a perimeter edge region of the rear substrate of the reflective element and in electrical conductive continuity with an electrically conductive coating at the rear substrate of the reflective element.

In the illustrated embodiment, and as shown in FIGS. 40-42, the primary connecting element 540 comprises a PALNUT® type of connecting element, with a plurality of flexible tabs 540a disposed around an aperture 540b. The inner or contacting ends of the flexible tabs 540a may comprise sheared edges (as formed or established during the stamping or forming of the connector 530, and thus may bite into the wire when the wire is inserted into the connecting portion 533c. In the illustrated embodiment, the secondary connecting element 542 comprises an internal cantilever spring type connecting element, which provides a generally smooth or non-sharp surface 542a (FIGS. 40A, 41 and 42) for contacting the wire that is inserted into the connecting portion 533c. Thus, the PALNUT® type connecting element 540 may provide the primary retention locking feature and electrical connection between the connector 530 and the wire, while the internal cantilever spring connecting element 542 provides a secondary redundant electrical connection. The electrical connections on the PALNUT® type connecting element 540 may be made at a sheared edge of metal, where the connection to the cantilever spring connecting element 542 may be made at a plated smooth surface. Such a redundant electrically conductive connecting means provides enhanced environmental durability to the electrical connector (such as for situations where the cut edges may start to degrade, the smooth surface would not degrade, and thus one of the connecting elements would continue to provide electrically conductive continuity between the connector and the wire or lead).

Optionally, and desirably, the wire connecting portion 533c may be configured to allow for insertion of the wire from either end of the connecting portion to adapt or configure the connector for different applications and/or connection at different sides or regions of the reflective element. The wire connecting portion 533c thus may receive the end of the wire and be electrically conductively connected to the end of the wire and may include flexible tabs 540a that allow for insertion of the wire into the connecting portion 533c and that contact and may bite into the exposed wire to electrically conductively connect the wire to the connector, while limiting or substantially precluding retraction of the wire from the connecting portion. Optionally, the wire connecting portion may be crimped to a wire or otherwise connected to a wire (such as via solder or the like) to establish electrical continuity at the connection. The opposite end of the wire may be connected to a clip or terminal, such as a spade terminal or plug/socket connector of a wire harness or the like, at a circuit element or circuit board or the like. Optionally, the connecting portion of the electrical connector may comprise any suitable connector, such as a spade terminal or the like, and may allow for manual connection or insertion without soldering of the wire to the connecting portion, while remaining within the spirit and scope of the present invention.

Thus, electrical connector 530 may electrically conductively connect to the transparent conductive coating at the rear or second surface of the front substrate (such as a front substrate 520 of a reflective element assembly 514). For example, and as shown in FIG. 41, connecting portion 533a of electrical connector 530 may be disposed at the overhang region of the front substrate, but not clipped to the perimeter edge portion or region of the rear substrate. A conductive material 536 (such as a conductive potting material or conductive epoxy or the like) may be disposed at the overhang region and encapsulate at least a portion of the connecting portion 533a and contact the transparent conductive coating at the rear surface 520a of the front substrate 520 to conductively connect the connector 530 to the transparent conductive coating at the rear surface of the front substrate. The perimeter seal 525 of the reflective element assembly 514 may electrically and conductively isolate the connector 530 and the conductive material 536 from the conductive coating at the third or front surface 522a of the rear substrate 522, such as in a similar manner as discussed above. An adhesive or bonding material may be disposed at the perimeter edge region 522c of the rear substrate 522 at the overhang region and/or at the fourth surface 522b of the rear substrate 522 and at the wire connecting portion 533c to adhesively bond the connector 530 at the rear substrate 522 of the reflective element 514.

Optionally, the electrical connector for electrically conductively connecting to the conductive coating at the third or front surface of the rear substrate may be similar or substantially the same in construction to connector 530, discussed above. For example, and with reference to FIG. 42, the electrically connecting portion or clip 533a of electrical connector 530 may be clipped to the perimeter edge region 522d of the rear substrate 522 such that electrical conductivity is established between the connector 530 and the third surface conductive coating at the third surface or front surface 522a of rear substrate 522. When so clipped, the attachment portion 533b of connector 530 extends from the rear or fourth surface of the rear substrate and the wire connecting portion 533c is disposed at or along (and optionally spaced from) the rear or fourth surface 522a of the rear substrate 522.

The connector 530 thus may clip to the perimeter edge region of the rear substrate to establish electrical conductivity between the wire connecting portion and the third surface conductive coating on the front or third surface of the rear substrate of the reflective element. Thus, for assembly or attachment or connection to the third surface electrically conductive coating, the electrical connector may be clipped to the rear or second substrate using a clip configuration in a manner similar to known electrode clips, while the same part may be used for the epoxy connection to the second surface electrically conductive coating by orienting the connector at an angle such that the bottom legs of the clip or connecting portion 533a are disposed in or sit into the conductive epoxy dispensed in the offset region to make electrically conductive connection or contact with the second surface electrically conductive coating. Optionally, and desirably, an adhesive or glue may be disposed at the fourth surface and/or overhang region to mechanically attach the electrical connector at or to the fourth or rear surface of the rear glass substrate of the reflective element assembly.

Optionally, and desirably, an electrically conductive trace, such as a cured silver-filled conductive epoxy or the like, may be disposed along the edge of the substrate and may wrap onto the rear or fourth surface of the rear substrate. The connector may be held in place at the conductive epoxy and the epoxy may be cured to hold the connector at the glass substrate. The conductive epoxy thus may provide mechanical anchoring and environmental protection or sealing and electrical connection at the connection of the connector to the conductive coatings. Thus, a preformed metallic connector may be adhered to the substrate and electrically connected or conductively connected to the conductive coating via a conductive epoxy or the like.

Optionally, the reflective element assembly may include a heater pad disposed at a rear surface of the reflective element, and may include a backplate disposed at and at least partially over the heater pad. For example, and with reference to FIGS. 26-27B, a reflective element assembly 410 (such as for an exterior rearview mirror assembly of a vehicle) includes an electro-optic reflective element 412 (such as en electrochromic reflective element or cell), a heater pad 414 and a backplate 416.

The reflective element or cell 412 has electrical connectors 412a, 412b, such as male spade connectors or the like, and such as electrical connectors of the types described above. The electrical connectors 412a, 412b are electrically conductively connected (such as via busbars or the like disposed at the reflective element) to the electrically conductive coatings on the first and second substrates of the reflective element, such as in any suitable manner and such as described above. In the illustrated embodiment, the electrical connectors 412a, 412b are disposed or established at opposite sides of the reflective element and are readily accessible at the rear surface of the reflective element for connection to electrical connectors 414a, 414b of heater pad 414 when the heater pad is affixed or adhered to the rear surface of the reflective element 412.

Figure 26:
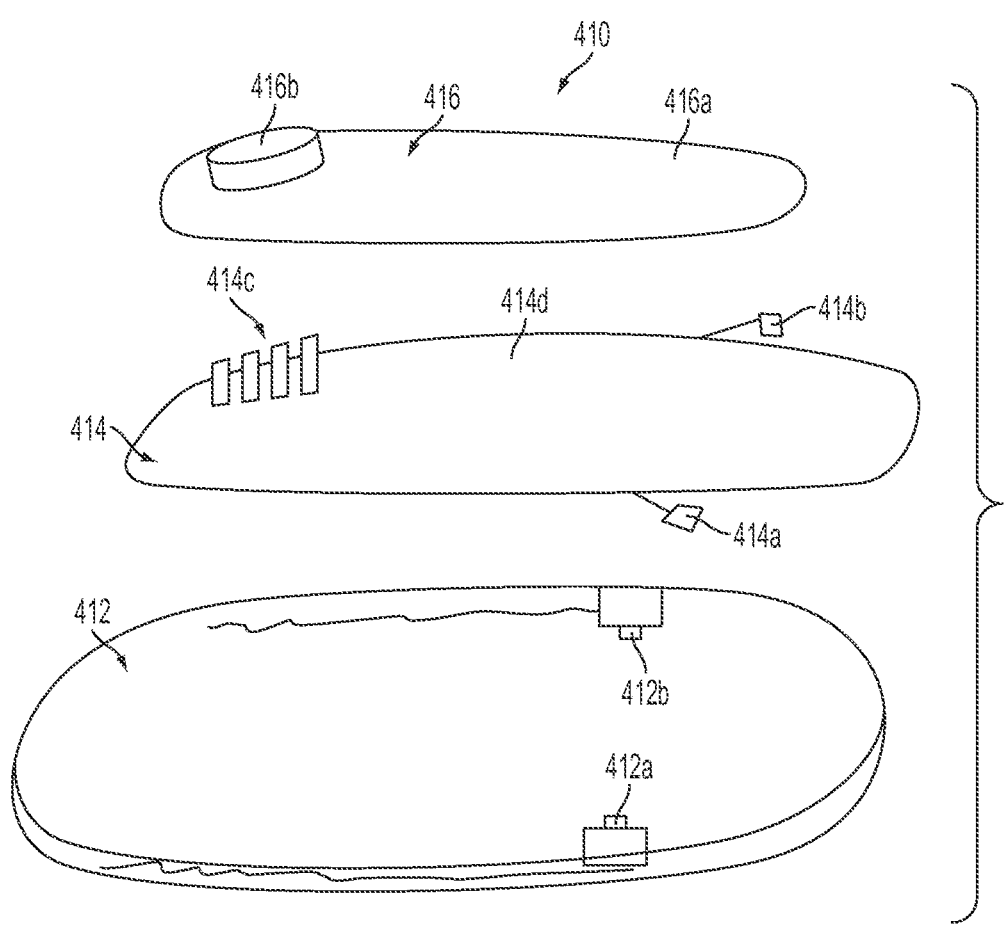
FIG. 26 is an exploded perspective view of a rearview mirror reflective element assembly with a heater pad and backplate in accordance with the present invention.
Figure 27:
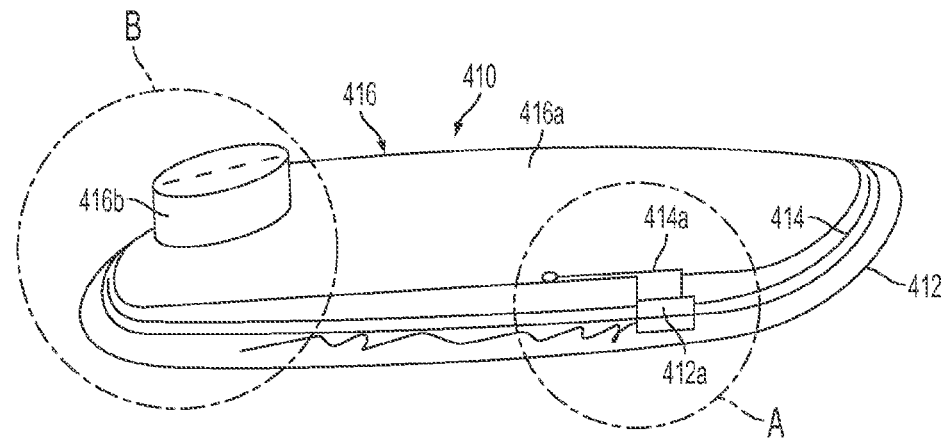
FIG. 27 is a perspective view of the rearview mirror reflective element assembly of FIG. 26.
Figure 27A:
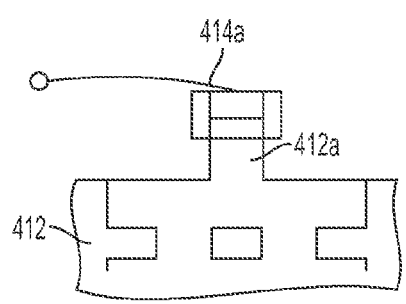
FIG. 27A is an enlarged view of the area A of FIG. 27, showing an electrical connector at the reflective element that electrically connects to electrical wiring of the heater pad in accordance with the present invention.
Figure 27B:
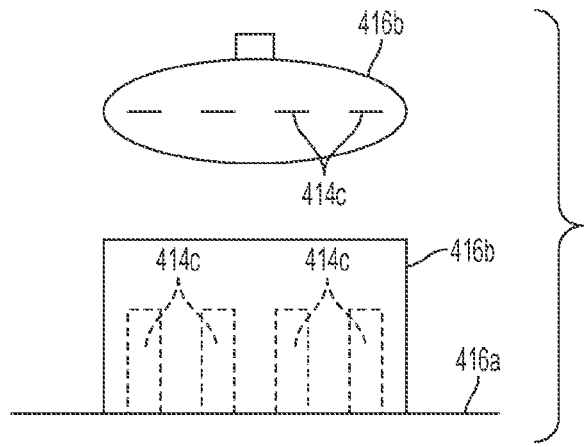
FIG. 27B is an exploded schematic of the area B of FIG. 27, showing the electrical connector at the backplate of the rearview mirror reflective element assembly of FIG. 27.
Figure 31:
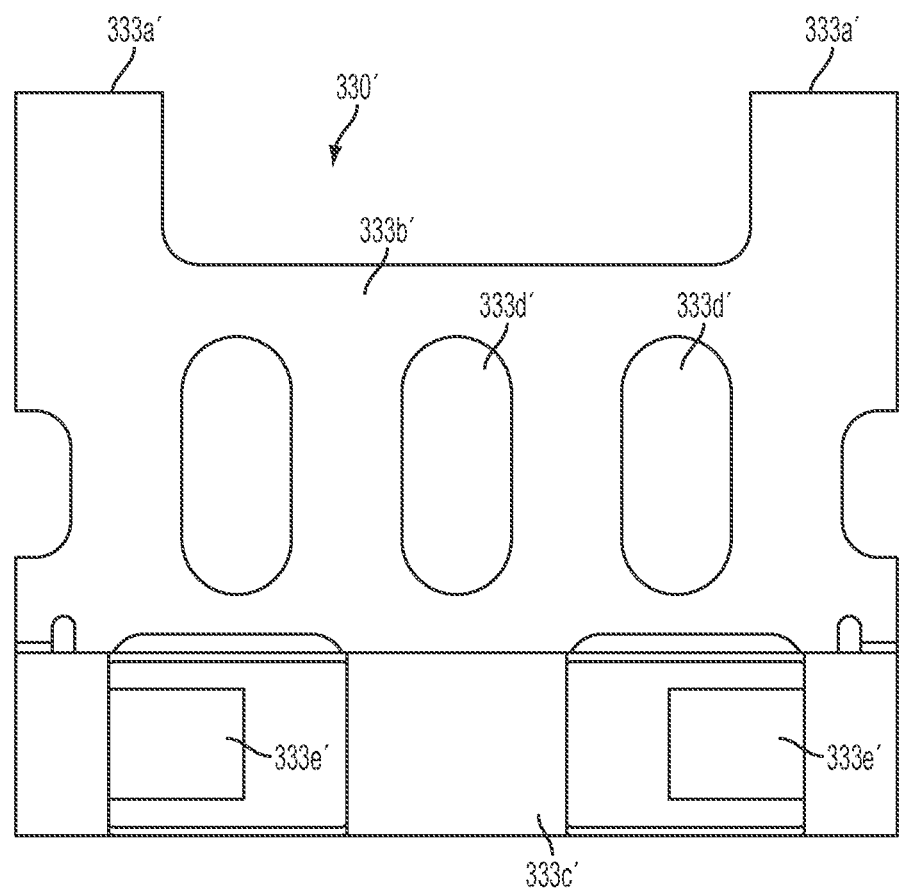
FIG. 31 is another plan view of the electrical connector of FIGS. 28-30.
Figure 32:
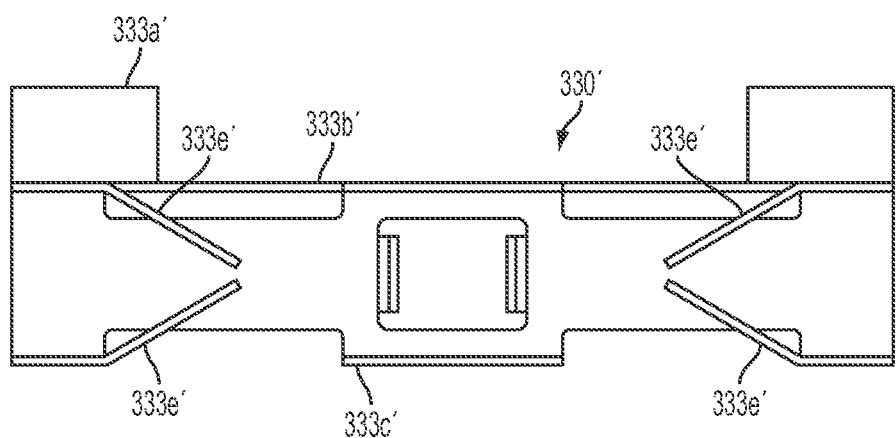
FIG. 32 is another plan view of the electrical connector of FIGS. 28-31.

Heater pad 414 may be similar to known heater pads, and may utilize aspects described in U.S. Pat. Nos. 4,882,466 and/or 7,400,435, which are hereby incorporated herein by reference in their entireties. As shown in FIG. 26, heater pad includes electrical connectors 414a, 414b for electrically conductively connecting to connectors 412a, 412b of reflective element 412. In the illustrated embodiment, electrical connectors 414a, 414b (such as female spade connectors or the like) are disposed at the ends of respective wires that extend from opposite sides of the heater pad 414, whereby the electrical connectors 414a, 414b may be readily connected to the electrical connectors 412a, 412b during the assembly process of the reflective element assembly. Heater pad 414 also includes a plurality of electrical terminals 414c protruding from the heater pad substrate 414d, with the terminals 414c being associated with the electrical connectors 414a, 414b and with the heating elements (not shown) of the heater pad substrate 414d.

As shown in FIG. 26, backplate 416 may comprise a generally planar portion 416a with a molded socket connector 416b extending rearwardly from the planar portion 416a (and desirably unitarily formed or integrally molded, such as via injection molding, with the generally planar backplate portion 416a). When backplate 416 is attached to heater pad 414 and/or reflective element 412, terminals 414c of heater pad 414 extend at least partially into molded connector 416b, whereby the terminals may be in electrical conductive contact with terminals or ends of wires of a vehicle or mirror wiring harness that may plug into the socket connector 416b to provide power and control to the heater pad and reflective element cell when the reflective element assembly is normally mounted at a rearview mirror assembly of a vehicle.

Optionally, and desirably, the electrical conductive connections are established via male spade connectors 412a, 412b and female spade connectors 414a, 414b or vice versa or the like, and thus may obviate the need for soldering the leads to the reflective element. Optionally, and desirably, the heater pad may include circuitry for driving the electro-optic cell, thereby reducing or obviating the need for a wiring harness and wire routing to the reflective element. Also, because the connectors are disposed at opposite sides of the reflective element, the connections may be readily made during the assembly process in an enhanced and error proof manner that limits or substantially precludes connecting the wrong connectors together.

Thus, a male connector at an end of a mirror wiring harness may be plugged into the molded connector 416b of backplate 416 to provide power and/or control to the heater pad and to the electro-optic reflective element cell. The assembly of the reflective element assembly or sub-assembly is enhanced by the connections between the reflective element and the heater pad and by the establishment of the female or socket connector at the backplate during assembly of the reflective element assembly or sub-assembly.

Optionally, and desirably, the assembly of components 416, 414, 412 may be accomplished in a z-axis fashion (see FIG. 26), where the heater pad 414 connects to the reflective element 412 and the backplate 416 connects to the heater pad 414, preferably with electrical and/or mechanical connections being made at the same or substantially the same time, and more preferably without any need for an electrical solder connection (or at least reduced minimal need for a solder connection). For example, the electrical connectors or leads may comprise plug and socket type mechanical and electrical connection or connect & crimp type mechanical and electrical connection or interference fit mechanical and electrical connection so that the solderless electrical connections can be made as the mechanical connection or attachments are made, thereby reducing manual operations and enhancing the assembly process of the reflective element/heater pad/backplate assembly. Optionally, the electrical connections may be provided by a flying lead or wire, such as at the heater pad for connecting to the terminals or leads at the reflective element or, for example, in an interior mirror application (such as discussed in connection with FIGS. 1-16 above) from a connection to a transparent electrically conductive coating of an electrochromic mirror element to a connector on a printed circuit board disposed at the rear of the electrochromic mirror element or cell.

Therefore, in accordance with various aspects of the present invention, a low cost mirror assembly is provided that has reduced cost components and/or reduced cost coatings and/or reduced cost connection processes and/or reduced cost assembly processes. For example, aspects of the present invention may substantially or entirely obviate or substantially reduce the need for soldering (that may involve costly human processes) to make the electrical connections. Also, for example, aspects of the present invention discussed above allow for the size of the busbar clips or electrical clips at the reflective element to be reduced (typically, such elongated clips that clip to the edges of the reflective element substrates may be about 6 to 8 inches long or thereabouts), whereby the electrical clips in accordance with the present invention may have a length that is reduced to about 2 inches or less, preferably about 1 inch or less, such as ½ inch or ¼ inch or thereabouts, thus providing lower cost components.

Also, the use of a fourth surface opaque (i.e., substantially non-light-transmitting) reflecting or transmission-reducing thin film coating, such as a metallic coating (such as a chromium coating or the like, such as discussed above) allows for a sputter up/sputter down process of coating the third and fourth surfaces of the rear substrate of an electrochromic mirror cell in the same unitary vacuum-deposition process/chamber (with appropriate masking as described above) and obviates the need to use a potentially costly black or similarly opacifying tape or coating at the fourth surface (that is typically required at the rear surface of a reflective element). Typically, such black tape is relatively expensive, but the use of such costly black tape can be obviated by the novel application of an opaque reflecting or transmission-reducing thin film coating at the fourth surface. The present invention thus provides a rear substrate with a third surface transflective mirror reflector, and the process of manufacturing the reflective element may include masking the rear surface at the location where a display and/or photosensor is to be disposed and then coating (preferably simultaneous with the coating of the front surface as described above) the rear surface with a chromium or similar metallic coating (which is typically much less costly than known conventional black opacifying tapes and the like, which need to be carefully disposed at the rear surface to limit or substantially preclude formation of bubbles or imperfections that may be viewable through the third surface transflector) of sufficient thickness to be significantly light absorbing, such as a thickness of at least about 300 angstroms, more preferably at least about 500 angstroms and more preferably at least about 750 angstroms. Optionally, the third and fourth surfaces may be coated during the same sputter-up/sputter-down coating process (such as in the same vacuum-deposition chamber and/or process) or the like to further reduce the manufacturing costs. The chromium coated or similar metal coated fourth surface may then be substantially covered/protected with a low cost scatter-proofing or shatter-proofing tape, such as with a hot melt polymer film or the like (and such tape need not be any special opaque tape but can be a low cost tape and can be laid down over the chromium-coated or opaque reflecting or transmission-reducing thin film coated rear surface of the substrate in any manner, since any bubbles or imperfections that may be present will not be viewable through the opaque reflecting or transmission-reducing thin film coating at the rear surface of the reflective element).

Optionally, and desirably, the fourth surface opaque or transmission-reducing thin film metallic coating is formed of an environmentally durable metal thin film, such as a sputtered chromium or similar environmentally durable metal layer. For example, metal thin film mirror reflectors, such as of titanium and chromium and stainless steel and the like, such as are used as first surface automotive exterior mirror reflectors, have the environmental resilience and stability desired herein. To have the desired reduction in light transmission (such as transmitting, for example, less than about 1 percent of incident light through the opaque or transmission-reducing thin film coating), the transmission-reducing thin film layer or coating may have a physical thickness of at least about 300 angstroms, more preferably at least about 500 angstroms and more preferably at least about 700 angstroms, and are formed or established at the rear or fourth surface of the rear substrate by a vacuum-deposition sputter coating process.

Thus, in accordance with the present invention, an electro-optic mirror element, such as an electrochromic mirror element, is provided that comprises a front substrate and a rear substrate, with an electro-optic medium (preferably an electrochromic medium and less preferably a liquid crystal medium) disposed or sandwiched therebetween. The rearmost or fourth surface of the rear substrate comprises a sputtered, environmentally stable metallic reflector or thin film coating or layer, such as chromium metal layer or the like, that has a physical thickness selected so as to be substantially reflecting (preferably at least about 35 percent reflecting, more preferably at least about 45 percent reflecting, and more preferably at least about 55 percent reflecting) of light that passes through the electro-optic medium (at locations away from the window or aperture established through the metal thin film coating), and that has a physical thickness and material property so as to be substantially opaque to visible light incident upon the rearmost or fourth surface of the mirror reflective element (i.e., transmitting less than, for example, about 1 percent of incident light, and more preferably transmitting less than, for example, about 0.5 percent of incident light and more preferably transmitting less than, for example, about 0.1 percent of incident light). The opposing surface of the rear substrate (i.e., the third surface of the laminate sandwich assembly) is coated with a transflective reflector as described above. However, where a display is desired to be seen by the driver of the equipped vehicle through the reflective element or where a photosensor is desired to view through the reflective element, an aperture or hole or window (preferably with a tapered or non-sharp gradient in the opaque reflective thin film coating around and circumscribing the window) is established at and through the fourth surface coating at the rearmost surface of the reflective element.

Optionally, the present invention may also provide for a reduced cost aperture or window established at and through the opaque reflecting or transmission-reducing thin film coating or chromium or metallic coating at the rear surface of the substrate, such as for a video display or an information display or a sensor or the like. As discussed above, the aperture or window may be established or provided in a manner that further reduces the assembly costs of the reflective element assembly. For example, the aperture or window may have fuzzy or non-sharp edges so that it is not readily viewable and discernible to a person viewing through the reflective element, and thus may not require the location precision typically required for conventional windows, thereby further reducing the manufacturing costs associated with the reflective element assembly of the present invention. Thus, the present invention provides multiple cost-reducing aspects that reduce the content costs and the manufacturing and assembly costs associated with the reflective element assembly and mirror assembly.

The interior mirror assembly or assemblies discussed herein may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 7,310,178; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are all hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Optionally, the reflective element may include a metallic perimeter band around the perimeter of the reflective element, such as by utilizing aspects of the reflective elements described in U.S. Pat. Nos. 7,274,501; 7,184,190; and/or 7,255,451, PCT Application No. PCT/US2006/018567, filed May 15, 2006 by Donnelly Corp. et al.; PCT Application No. PCT/US03/29776, filed Sep. 19, 2003 by Donnelly Corp. et al.; and/or PCT Application No. PCT/US03/35381, filed Nov. 5, 2003 by Donnelly Corp. et al., and/or U.S. patent application Ser. No. 11/912,576, filed Oct. 25, 2007, now U.S. Pat. No. 7,626,749; and/or Ser. No. 11/226,628, filed Sep. 14, 2005, and published Mar. 23, 2006 as U.S. Publication No. US 2006/0061008, which is hereby incorporated herein by reference in their entireties. Optionally, the perimeter band may comprise a chrome/chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,360,932; 7,255,451; 7,274,501; and/or 7,184,190, and/or PCT Application No. PCT/US2006/018567, filed May 15, 2006; PCT Application No. PCT/US2004/015424, filed May 18, 2004 and published on Dec. 2, 2004 as International Publication No. WO 2004/10377282; and/or U.S. patent application Ser. No. 11/912,576, filed Oct. 25, 2007, now U.S. Pat. No. 7,626,749; Ser. No. 11/226,628, filed Sep. 14, 2005, and published Mar. 23, 2006 as U.S. Publication No. US 2006/0061008; and/or Ser. No. 10/538,724, filed Jun. 13, 2005, and published Mar. 9, 2006 as U.S. Publication No. US 2006/0050018; and/or U.S. provisional applications, Ser. No. 61/187,112, filed Jun. 15, 2009; Ser. No. 61/172,022, filed Apr. 23, 2009; Ser. No. 61/249,300, filed Oct. 7, 2009; and/or Ser. No. 61/261,839, filed Nov. 17, 2009, which are hereby incorporated herein by reference in their entireties.

The mounting assembly of the mirror assembly attached to an interior portion of the vehicle, such as to an inner surface of a vehicle windshield (such as to a mounting button or attachment element adhered to the interior surface of the vehicle windshield). The mounting assembly may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. The mounting assembly may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005, and published Mar. 23, 2006 as U.S. Publication No. US 2006/0061008, and/or U.S. provisional applications, Ser. No. 61/232,201, filed Aug. 7, 2009; Ser. No. 61/162,420, filed Mar. 23, 2009; and/or Ser. No. 61/255,192, filed Oct. 27, 2009, which are hereby incorporated herein by reference in their entireties).

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,338,177; 7,274,501; 7,255,451; 7,195,381; 7,184,190; 5,668,663; 5,724,187 and/or 6,690,268, and/or in U.S. patent application Ser. No. 11/520,193, filed Sep. 13, 2006, now U.S. Pat. No. 7,581,859; Ser. No. 12/091,525, filed Apr. 25, 2008, now U.S. Pat. No. 7,855,755; Ser. No. 11/226,628, filed Sep. 14, 2005, and published Mar. 23, 2006 as U.S. Publication No. US 2006/0061008; Ser. No. 10/538,724, filed Jun. 13, 2005, and published Mar. 9, 2006 as U.S. Publication No. US 2006/0050018; and/or Ser. No. 11/912,576, filed Oct. 25, 2007, now U.S. Pat. No. 7,626,749, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are all hereby incorporated herein by reference in their entireties.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005, and published Mar. 9, 2006 as U.S. Publication No. US 2006/0050018, which are hereby incorporated herein by reference in their entireties.

The display may comprise a video display and may utilize aspects of the video display devices or modules described in U.S. Pat. Nos. 6,690,268; 7,184,190; 7,274,501; 7,370,983; and/or 7,446,650, and/or U.S. patent application Ser. No. 12/091,525, filed Apr. 25, 2008, now U.S. Pat. No. 7,855,755; and/or Ser. No. 10/538,724, filed Jun. 13, 2005, and published Mar. 9, 2006 as U.S. Publication No. US 2006/0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The camera or camera module may comprise any suitable camera or imaging sensor, and may utilize aspects of the cameras or sensors described in U.S. patent application Ser. No. 12/091,359, filed Apr. 24, 2008, and published Oct. 1, 2009 as U.S. Publication No. US 2009/0244361; and/or Ser. No. 10/534,632, filed May 11, 2005, now U.S. Pat. No. 7,965,336; and/or U.S. Pat. No. 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; and 7,004,606; and/or U.S. patent application Ser. No. 11/315,675, filed Dec. 22, 2005, now U.S. Pat. No. 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008, and/or PCT Application No. PCT/US2008/078700, filed Oct. 3, 2008, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; and 7,339,149, and U.S. patent application Ser. No. 11/105,757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; and 6,946,978, and/or in U.S. patent application Ser. No. 10/643,602, filed Aug. 19, 2003, now U.S. Pat. No. 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,038,577; 5,929,786 and/or 5,786,772, and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005, and published Mar. 23, 2006 as U.S. Publication No. US 2006/0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the mirror assembly may include user inputs that may comprise buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 6,001,486; 6,310,611; 6,320,282; 6,627,918; 6,690,268; 7,224,324; 7,249,860; 7,253,723; 7,255,451; 7,360,932; and/or 7,446,924, and/or U.S. patent application Ser. No. 10/538,724, filed Jun. 13, 2005, and published Mar. 9, 2006 as U.S. Publication No. US 2006/0050018, and/or Ser. No. 12/576,550, filed Oct. 12, 2009, now U.S. Pat. No. 8,465,161, which are all hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or U.S. patent application Ser. No. 10/538,724, filed Jun. 13, 2005, and published Mar. 9, 2006 as U.S. Publication No. US 2006/0050018, and/or U.S. patent application Ser. No. 10/529,715, filed Mar. 30, 2005, now U.S. Pat. No. 7,657,052, which are all hereby incorporated herein by reference in their entireties.

Optionally, the mirror assembly may include one or more other accessories at or within the mirror casing or otherwise associated with or near the mirror assembly, such as one or more electrical or electronic devices or accessories, such as antennas, including global positioning system (GPS) or cellular phone antennas, such as disclosed in U.S. Pat. No.

5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093 and/or U.S. provisional application Ser. No. 61/785,565, filed May 15, 2009, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 6,243,003; 6,278,377; and/or 6,420,975; and/or U.S. patent application Ser. No. 10/529,715, filed Mar. 30, 2005, now U.S. Pat. No. 7,657,052, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786; 5,786,772; 7,492,281; 7,038,577 and 6,882,287; and/or U.S. patent application Ser. No. 11/315,675, filed Dec. 22, 2005, now U.S. Pat. No. 7,720,580; and/or Ser. No. 12/446,507, filed Apr. 21, 2009, now U.S. Pat. No. 8,058,977, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, and/or U.S. provisional application Ser. No. 61/785,565, filed May 15, 2009, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 6,690,268 and 6,847,487, and/or U.S. patent application Ser. No. 11/239,980, filed Sep. 30, 2005, now U.S. Pat. No. 7,881,496; Ser. No. 11/105,757, filed Apr. 14, 2005, now U.S. Pat. No. 7,526,103; Ser. No. 12/578,732, filed Oct. 14, 2009 and published Apr. 22, 2010 as U.S. Publication No. US-2010-0097469; and/or Ser. No. 12/508,840, filed Jul. 24, 2009 and published Jan. 28, 2010 as U.S. Pub. No. US 2010/0020170, an alert system, such as an alert system of the types described in PCT Application No. PCT/US2010/25545, filed Feb. 26, 2010, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or U.S. provisional application, Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442 and/or 5,632,092, a control system, such as a control system of the types described in U.S. provisional application Ser. No. 61/186,573, filed Jun. 12, 2009, and/or any other accessory or circuitry or the like (with the disclosures of the above-referenced patents and patent applications and provisional applications and PCT applications being hereby incorporated herein by reference in their entireties).

Changes and modifications to the specifically described embodiments may be carried out without departing from the principles of the present invention, which is intended to be limited only by the scope of the appended claims as interpreted according to the principles of patent law.

The invention claimed is:

1. A reflective element assembly for a vehicular rearview mirror assembly, said reflective element assembly comprising:

a front substrate having first and second surfaces;
a transparent conductive coating established at said second surface;
a rear substrate having third and fourth surfaces;
a third surface reflector established at said third surface;
an electro-optic medium disposed between said front and rear substrates;
wherein a perimeter region of said front substrate is offset from a perimeter region of said rear substrate such that an offset region is established at said perimeter region;
wherein an electrical connector comprises an attachment portion and a wire receiving portion for receiving an electrical wire therein;
wherein said attachment portion comprises a flange and at least one tab, and wherein said flange is configured to be disposed at said fourth surface of said rear substrate and said at least one tab is configured to extend at least partially across a perimeter edge of said rear substrate when said flange of said electrical connector is disposed at said offset region;
wherein an electrically conductive material is disposed in an uncured state at said offset region;
wherein said electrically conductive material comprises an electrically conductive epoxy;
wherein said electrical connector is disposed at said electrically conductive material when said electrically conductive material is uncured;
wherein, after said electrical connector is disposed at said offset region, said electrically conductive material is cured to secure said electrical connector at said rear substrate;
wherein said wire receiving portion of said electrical connector is configured to receive said electrical wire therein and includes at least one tang that engages said electrical wire when said electrical wire is inserted into said wire receiving portion, securing said electrical wire in said wire receiving portion and making electrical contact with said electrical wire; and
wherein said at least one tang of said electrical connector comprises at least one flexible tab having an edge that engages and bites into said electrical wire to electrically conductively connect with said electrical wire when said electrical wire is inserted into said wire receiving portion of said electrical connector.

2. The reflective element assembly of claim 1, wherein said electrical connector comprises a stamped metallic connector.

3. The reflective element assembly of claim 1, wherein said electrical connector electrically conductively connects said electrical wire to said transparent conductive coating at said second surface of said front substrate.

4. The reflective element assembly of claim 3, wherein electrically conductive continuity is established between said at least one tab and said transparent conductive coating at said second surface of said front substrate via said electrically conductive material disposed at said offset region.

5. The reflective element assembly of claim 1, wherein said electrical connector electrically conductively connects said electrical wire to a metallic conductive layer at said third surface of said rear substrate.

6. The reflective element assembly of claim 5, wherein said tab of said electrical connector is part of a clip element for clipping onto the perimeter edge of said rear substrate.

7. The reflective element assembly of claim 1, wherein said electrical wire comprises a stripped end of a wire of a wire harness of the vehicle.

8. The reflective element assembly of claim 1, wherein said electrically conductive material comprises an electrically conductive epoxy.

9. The reflective element assembly of claim 1, wherein said at least one tang of said electrical connector comprises a plurality of flexible tabs having respective edges that engage and bite into said electrical wire to electrically conductively connect with said electrical wire when said electrical wire is inserted into said wire receiving portion of said electrical connector.

10. The reflective element assembly of claim 1, wherein said wire receiving portion of said electrical connector comprises a contacting surface for engaging and electrically conductively connecting with said electrical wire when said electrical wire is inserted into said wire receiving portion of said electrical connector.

11. A reflective element assembly for a vehicular rearview mirror assembly, said reflective element assembly comprising:
- a front substrate having first and second surfaces;
- a transparent conductive coating established at said second surface;
- a rear substrate having third and fourth surfaces;
- a third surface reflector established at said third surface;
- an electro-optic medium disposed between said front and rear substrates;
- wherein said front substrate is offset from said rear substrate such that an offset region is established at a perimeter region of said rear substrate where said perimeter region of said rear substrate extends beyond a corresponding perimeter region of said front substrate;
- an electrical connector disposed at said offset region of said reflective element assembly;
- wherein said electrical connector comprises an attachment portion and a wire receiving portion for receiving an electrical wire therein;
- wherein said attachment portion comprises a clip element for clipping onto the perimeter edge of said rear substrate at said offset region, and wherein, when said clip element is clipped onto the perimeter edge of said rear substrate, said clip element makes electrical connection with said third surface reflector at said third surface of said rear substrate;
- wherein said wire receiving portion of said electrical connector is electrically conductively connected to said clip element of said electrical connector via at least one connecting element of said electrical connector, and wherein, when said clip element is clipped onto the perimeter edge of said rear substrate, said wire receiving portion is spaced from said fourth surface of said rear substrate via said at least one connecting element; and
- wherein said wire receiving portion of said electrical connector is configured to receive said electrical wire therein and includes a plurality of radially extending flexible tangs that, when said electrical wire is inserted into said wire receiving portion of said electrical connector, engage and electrically conductively connect with said electrical wire and secure said electrical wire in said wire receiving portion.

12. The reflective element assembly of claim 11, wherein said electrical connector comprises a stamped metallic connector and wherein said wire receiving portion, said at least one connecting element and said clip element are unitarily formed via stamping of the stamped metallic connector.

13. The reflective element assembly of claim 11, comprising a second electrical connector that electrically conductively connects a second electrical wire to said transparent conductive coating at said second surface of said front substrate, wherein said second electrical connector connects to said transparent conductive coating at a second offset region where another perimeter region of said front substrate extends beyond a corresponding other perimeter region of said rear substrate.

14. The reflective element assembly of claim 13, wherein electrically conductive continuity is established between said second electrical connector and said transparent conductive coating at said second surface of said front substrate via an electrically conductive material disposed at said second offset region.

15. The reflective element assembly of claim 14, wherein said second electrical connector comprises an attachment portion and a wire receiving portion for receiving an electrical wire therein, and wherein, when said attachment portion is disposed at said second offset region, said wire receiving portion of said second electrical connector is spaced from said fourth surface of said rear substrate via at least one connecting element of said second electrical connector, and wherein said wire receiving portion of said second electrical connector is configured to receive another electrical wire therein and includes a plurality of flexible tangs that, when the other electrical wire is inserted into said wire receiving portion of said second electrical connector, engage and electrically conductively connect with the other electrical wire and secure the other electrical wire in said wire receiving portion of said second electrical connector.

16. The reflective element assembly of claim 11, wherein said wire receiving portion includes a flexible tab that is biased towards engagement with a stripped end of said electrical wire to further electrically conductively connect with said electrical wire when said stripped end of said electrical wire is inserted into said wire receiving portion of said electrical connector.

17. A reflective element assembly for a vehicular rearview mirror assembly, said reflective element assembly comprising:
- a front substrate having first and second surfaces;
- a transparent conductive coating established at said second surface;
- a rear substrate having third and fourth surfaces;
- a third surface reflector established at said third surface;
- an electro-optic medium disposed between said front and rear substrates;

wherein said front substrate is offset from said rear substrate such that an offset region is established at a perimeter region of said reflective element assembly;

an electrical connector disposed at said offset region of said reflective element assembly;

wherein said electrical connector comprises an attachment portion, a wire receiving portion and a connecting portion connecting between said attachment portion and said wire receiving portion;

wherein said electrical connector comprises a stamped metallic connector and wherein said wire receiving portion, said connecting portion and said attachment portion are unitarily formed via stamping of the stamped metallic connector;

wherein, when said electrical connector is disposed at said offset region, said attachment portion makes electrical connection with one of (i) said third surface reflector at said third surface of said rear substrate and (ii) said transparent conductive coating at said second surface of said front substrate;

wherein said wire receiving portion of said electrical connector is electrically conductively connected to said attachment portion of said electrical connector via said connecting portion of said electrical connector;

wherein said wire receiving portion of said electrical connector is configured to receive a stripped end of an electrical wire of a wire harness of the vehicle;

wherein said wire receiving portion includes a first wire connecting element comprising a plurality of radially extending flexible tangs having inner edges that, when said stripped end of said electrical wire is inserted into said wire receiving portion of said electrical connector, engage and electrically conductively connect with said electrical wire and secure said electrical wire in said wire receiving portion; and wherein said wire receiving portion includes a second wire connecting element comprising a flexible tab having a contact surface and that is biased towards engagement with said stripped end of said electrical wire to further electrically conductively connect with said electrical wire when said stripped end of said electrical wire is inserted into said wire receiving portion of said electrical connector.

18. The reflective element assembly of claim 17, wherein said inner edges of said flexible tangs flex in one direction to allow for insertion of said stripped end of said electrical wire and engage the inserted stripped end of said electrical wire to limit retraction of said electrical wire from said wire receiving portion, and wherein said contact surface of said second wire connecting element comprises a non-sharp contact surface for contacting a portion of said stripped end of said electrical wire that is inserted into said wire receiving portion.

19. The reflective element assembly of claim 17, wherein said offset region is established at a perimeter region of said rear substrate where said perimeter region of said rear substrate extends beyond a corresponding perimeter region of said front substrate, and wherein said attachment portion of said electrical connector comprises a clip element that clips onto the perimeter edge of said rear substrate at said offset region, and wherein, when said clip element is clipped onto the perimeter edge of said rear substrate, said clip element makes electrically conductive contact with said third surface reflector.

20. The reflective element assembly of claim 17, wherein said offset region is established at a perimeter region of said front substrate where a perimeter region of said front substrate extends beyond a corresponding perimeter region of said rear substrate, and wherein, when said electrical connector is disposed at said rear substrate, electrically conductive continuity is established between said attachment portion of said electrical connector and said transparent conductive coating at said second surface of said front substrate via an electrically conductive material disposed at said offset region.

* * * * *